(12) United States Patent
Allen et al.

(10) Patent No.: US 7,576,951 B2
(45) Date of Patent: Aug. 18, 2009

(54) PERPENDICULAR MAGNETIC WRITE HEAD HAVING A MAGNETIC WRITE POLE WITH A CONCAVE TRAILING EDGE

(75) Inventors: Donald G. Allen, Morgan Hill, CA (US); Amanda Baer, Campbell, CA (US); Michael Feldbaum, San Jose, CA (US); Hung-Chin Guthrie, Saratoga, CA (US); Wen-Chien David Hsiao, San Jose, CA (US); Yimin Hsu, Sunnyvale, CA (US); Ming Jiang, San Jose, CA (US); Yinshi Liu, Foster City, CA (US); Aaron Neuhaus, San Jose, CA (US); Vladimir Nikitin, Campbell, CA (US); Aron Pentek, San Jose, CA (US); Katalin Pentek, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 369 days.

(21) Appl. No.: 11/411,556

(22) Filed: Apr. 25, 2006

(65) Prior Publication Data

US 2007/0258167 A1      Nov. 8, 2007

(51) Int. Cl.
    *G11B 5/127* (2006.01)
(52) U.S. Cl. .................................. 360/125.13
(58) Field of Classification Search ............... 360/126, 360/125.03, 125.1, 125.11, 125.12, 125.13, 360/125.14, 125.15, 125.08; 29/603.07
    See application file for complete search history.

(56) References Cited

U.S. PATENT DOCUMENTS 4,592,801 A     6/1986   Hara et al. ............... 156/643

(Continued)

FOREIGN PATENT DOCUMENTS

JP          62-8320           1/1987

(Continued)

OTHER PUBLICATIONS

Okada et al., "Newly Developed Wraparound-Shielded Head For Perpendicular Recording" IEEE Transactions on Magnetics, vol. 41, No. 10, Oct. 2005.

(Continued)

*Primary Examiner*—Tianjie Chen
(74) *Attorney, Agent, or Firm*—Zila-Kotab, PC

(57) ABSTRACT

A magnetic write head for perpendicular magnetic recording having a write pole with a concave trailing edge. The magnetic write pole can have a trapezoidal shape with first and second laterally opposed sides that are further apart at the trailing edge than at the leading edge. The write head may or may not include a magnetic trailing shield, and if a trailing shield is included it is separated from the trailing edge by a non-magnetic write gap layer. The concave trailing edge improves magnetic performance such as by improving the transition curvature. A method for constructing the write head includes forming a magnetic write pole by forming a mask structure over a deposited write pole material, the mask structure having an alumina hard mask and an image transfer layer such as DURAMIDE®. An alumina fill layer is then deposited and a chemical mechanical polish is performed to open up the image transfer layer. A reactive on etch is performed to remove the image transfer layer and a reactive ion mill or reactive ion etch is performed to remove the alumina hard mask and form a concave surface on the write pole.

7 Claims, 46 Drawing Sheets

U.S. PATENT DOCUMENTS

| | | | | |
|---|---|---|---|---|
| 5,075,956 | A | 12/1991 | Das | 29/603 |
| 5,402,295 | A | 3/1995 | Suzuki et al. | 360/126 |
| 5,673,163 | A | 9/1997 | Cohen | 360/126 |
| 5,850,326 | A | 12/1998 | Takano et al. | 360/122 |
| 6,229,678 | B1 | 5/2001 | Xue et al. | 360/327.22 |
| 6,316,329 | B1 | 11/2001 | Hirota et al. | 438/424 |
| 6,358,635 | B1 | 3/2002 | Min et al. | 428/692 |
| 6,391,212 | B1 | 5/2002 | Cohen | 216/22 |
| 6,687,085 | B2 | 2/2004 | Minor et al. | 360/126 |
| 6,697,221 | B2 * | 2/2004 | Sato et al. | 360/125.13 |
| 6,700,760 | B1 | 3/2004 | Mao | 360/324.2 |
| 6,738,233 | B2 | 5/2004 | Khizrocv et al. | 360/319 |
| 6,741,421 | B2 * | 5/2004 | Mochizuki et al. | 360/125.13 |
| 6,771,462 | B1 * | 8/2004 | Khizroev et al. | 360/122 |
| 6,833,976 | B2 | 12/2004 | Hsu et al. | 360/119 |
| 6,901,651 | B2 | 6/2005 | Sato et al. | 29/603.07 |
| 6,950,277 | B1 * | 9/2005 | Nguy et al. | 360/125.14 |
| 6,952,325 | B2 * | 10/2005 | Sato et al. | 360/125.08 |
| 6,954,340 | B2 | 10/2005 | Shukh et al. | 360/317 |
| 7,120,988 | B2 * | 10/2006 | Le et al. | 29/603.07 |
| 2002/0027754 | A1 | 3/2002 | Ding et al. | 360/327.22 |
| 2003/0112562 | A1 | 6/2003 | Dimitrov et al. | 360/320 |
| 2004/0161636 | A1 | 8/2004 | Hujanen et al. | 428/692 |
| 2004/0184190 | A1 | 9/2004 | Han et al. | 360/126 |
| 2004/0218312 | A1 | 11/2004 | Montano | 360/317 |
| 2005/0041337 | A1 | 2/2005 | Yazawa et al. | 360/126 |
| 2005/0068665 | A1 | 3/2005 | Le et al. | 360/97.01 |
| 2005/0068669 | A1 | 3/2005 | Hsu et al. | 360/125 |
| 2005/0068678 | A1 | 3/2005 | Hsu et al. | 360/126 |
| 2005/0073773 | A1 | 4/2005 | Sasaki et al. | 360/126 |
| 2005/0083605 | A1 | 4/2005 | Hu et al. | 360/125 |
| 2005/0117250 | A1 | 6/2005 | Oikawa | 360/125 |
| 2005/0122622 | A1 | 6/2005 | Maruyama et al. | 360/126 |
| 2005/0141137 | A1 | 6/2005 | Okada et al. | 360/122 |
| 2005/0190479 | A1 | 9/2005 | Terris et al. | 360/59 |
| 2006/0002019 | A1 | 1/2006 | Guthrie et al. | 360/125 |
| 2006/0044681 | A1 * | 3/2006 | Le et al. | 360/126 |
| 2007/0115584 | A1 * | 5/2007 | Balamane et al. | 360/126 |

FOREIGN PATENT DOCUMENTS

| | | |
|---|---|---|
| JP | 11-31906 | 11/1999 |
| JP | 2000-298968 | 10/2000 |

OTHER PUBLICATIONS

Kawabe et al., "Selective Ion Beam Etching of Al$_2$O$_3$ Films" J. Electrochem. Soc., vol. 138, No. 9, Sep. 1991.

Jayasekara et al., "A Reactive Ion Milling Process for Patterning Narrow Track Iron Nitride Recording Head Poles At The Wafer Level" IEEE Transactions on Magnetics, vol. 33, No. 5, Sep. 1997.

* cited by examiner

PERPENDICULAR MAGNETIC WRITE HEAD HAVING A MAGNETIC WRITE POLE WITH A CONCAVE TRAILING EDGE

This invention is related to commonly assigned patent application Ser. No. 11/286,077, entitled WRITE HEAD DESIGN AND METHOD FOR REDUCING ADJACENT TRACK INTERFERENCE AT VERY NARROW TRACK WIDTHS, filed Nov. 23, 2005.

FIELD OF THE INVENTION

The present invention relates to perpendicular magnetic recording and more particularly to a perpendicular magnetic write head having a novel write pole design and method of manufacture thereof.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to be antiparallel coupled to the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One of the features of perpendicular recording systems is that the high coercivity top layer of the magnetic medium has a high switching field. This means that a strong magnetic field is needed to switch the magnetic moment of the medium when writing a magnetic bit of data. In order to decrease the switching field and increase recording speed, attempts have been made to angle or "cant" the write field being emitted from the write pole. Canting the write field at an angle relative to the normal of the medium makes the magnetic moment of the medium easier to switch by reducing the switching field. Modeling has shown that a single pole writer in a perpendicular recording system can exhibit improved transition sharpness (ie. better field gradient and resolution), achieve better media signal to noise ratio, and permit higher coercive field media for higher areal density magnetic recording if, according to the Stoner-Wohlfarth model for a single particle, the effective flux field is angled. A method that has been investigated to cant the magnetic field has been to provide a trailing magnetic shield adjacent to the write head, to magnetically attract the field from the write pole.

The trailing shield can be a floating design, in that the magnetic trailing shield is not directly, magnetically connected with the other structures of the write head. Magnetic field from the write pole results in a flux in the shield that essentially travels through the magnetic medium back to the return pole of the write head. The trailing shield can also be a stitched design that is magnetically connected with other magnetic structures of the write head such as the return pole. Various dimensions of the shield are critical for the floating trailing shield to operate correctly. For instance, effective angling or canting of the effective flux field is optimized when the write pole to trailing shield separation (gap) is about equal to the head to soft underlayer spacing (HUS) and the trailing shield throat height is preferably roughly equal to half the track-width of the write pole. This design improves write field gradient at the expense of effective flux field. To minimize effective flux field lost to the trailing shield and still achieve the desired effect, the gap and shield thickness are adjusted to minimize saturation at the shield and effective flux field lost to the shield respectively. In order for a trailing shield to function optimally, the thickness of the trailing shield gap must be tightly controlled. Therefore, there is a need for a means for accurately controlling such trailing gap thickness during manufacture.

It is difficult, however, to construct a write head having a desired write pole shape with tightly controlled critical dimensions, while also constructing a trailing shield with a desired well controlled trailing shield gap thickness. Furthermore, write pole and shield configurations are needed that can maximize the performance of the write pole while minimizing field lost to the trailing shield. In addition the critical dimensions of the write pole itself must be well defined. Furthermore, the write pole should be configured so as to maximize the magnetic performance of the write head, such as by minimizing transition curvature. Therefore, there is a need for a method or design for constructing a write head that can meet these all of these needs. Such a design or method must be manufacturable, allowing the write head to manufactured in large batch manufacturing processes, without incurring significant additional manufacturing expense or complexity.

SUMMARY OF THE INVENTION

The present invention provides a magnetic write head for perpendicular magnetic recording. The write includes a write pole having first and second laterally opposed sides, a leading edge extending from the first side to the second side and a trailing edge opposite the leading edge and having a concave shape.

The write pole may have a trapezoidal shape in that the distance between the first and second sides is less at the leading edge than at the trailing edge. The magnetic write head may also have a trailing magnetic shield that is separated from the trailing edge of the write pole by a non-magnetic write gap. However, the write head could also be constructed to not have a trailing shield.

The concave shape of the write pole can be formed by a novel manufacturing process that includes depositing a magnetic write pole material on a substrate and then forming a mask structure over the magnetic write pole layer. The mask can include an alumina hard mask adjacent to the write pole and an image transfer layer which can be constructed of, for example a soluble polyimide solution such as DURAMID®.

An alumina fill layer is deposited, and then a chemical mechanical polish (CMP) is performed to open up (expose) the image transfer layer. A reactive ion mill may be performed to remove some of the alumina fill layer, and then a reactive ion etch can be performed to remove the image transfer layer. A reactive ion mill (such as in a $CHF_3/Ar$ atmosphere) can then be performed to remove all or a portion of the alumina hard mask and to form the write pole with a concave surface.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
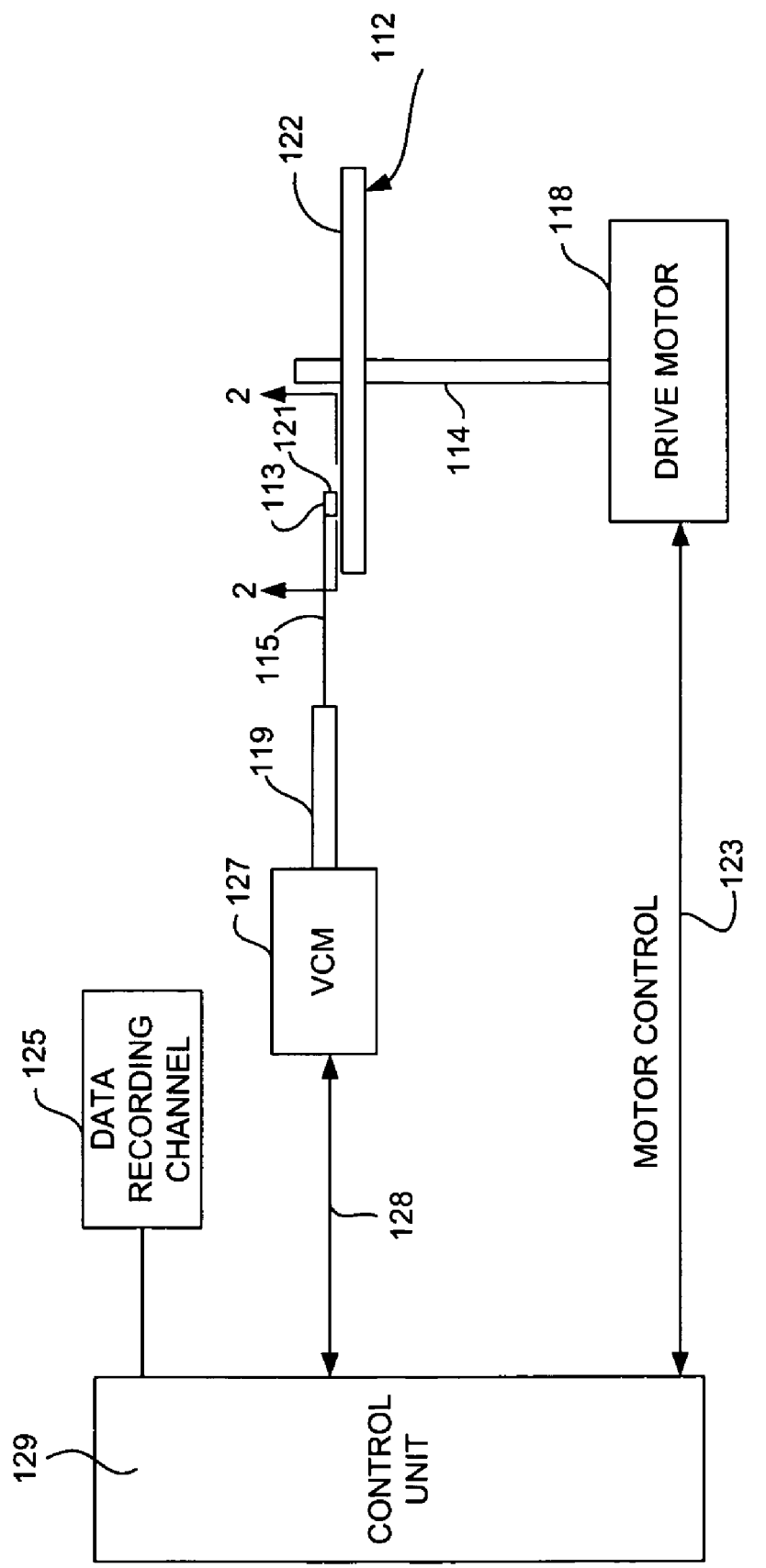
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 221. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
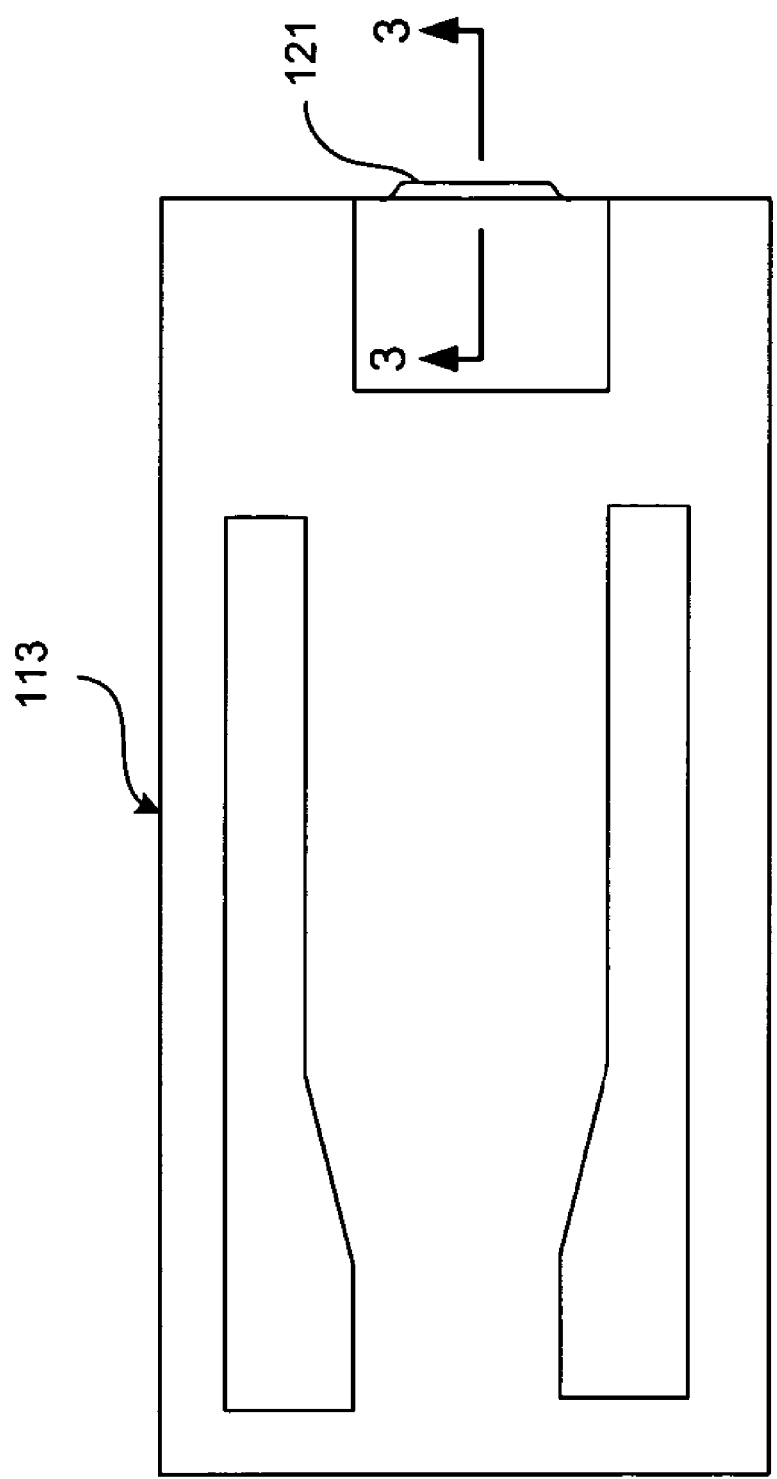
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
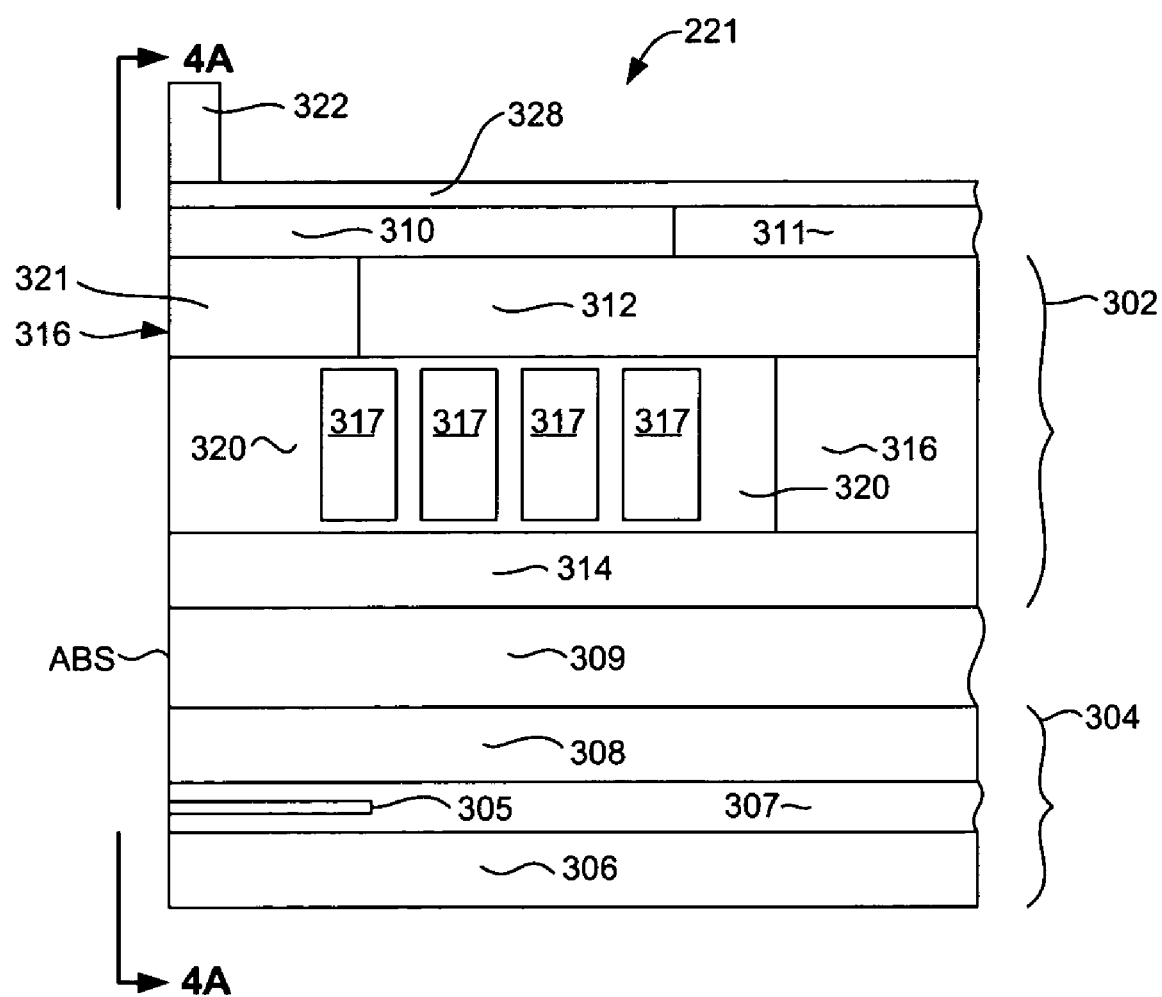
FIG. 3 is a cross sectional view view, taken from line 3-3 of FIG. 2 and rotated 90 degrees counterclockwise, of a magnetic head according to an embodiment of the present invention

With reference now to FIG. 3, the magnetic head 221 for use in a perpendicular magnetic recording system is described. The head 221 includes a write element 302 and a read element 304. The read element includes a magnetoresistive sensor 305, such as a giant magnetoresistive (GMR) or a tunnel valve (TMR). However, the sensor 304 could be another type of sensor such as a current in plane (CIP) GMR sensor or, a tunnel junction sensor (TMR) or some other type of sensor. The sensor 305 is located between and insulated from first and second magnetic shields 306, 308 and embedded in a dielectric material 307. The magnetic shields, which can be constructed of for example CoFe or NiFe, absorb magnetic fields, such as those from uptrack or down track data signals, ensuring that the read sensor 304 only detects the desired data track located between the shields 306, 308. A non-magnetic, electrically insulating gap layer 309 may be provided between the shield 308 and the write head 302.

With continued reference to FIG. 3, the write element 302 includes a write pole 310 that is magnetically connected with a magnetic shaping layer 312, and is embedded within an insulation material 311. The write pole has a small cross section at the air bearing surface and is constructed of a material having a high saturation moment, such as NiFe or CoFe. More preferably, the write pole 310 is constructed as a lamination of layers of magnetic material separated by thin layers of non-magnetic material. The write element 302 also has a return pole 314 that preferably has a surface exposed at the ABS and has a cross section parallel with the ABS surface that is much larger than that of the write pole 310. The return pole 314 is magnetically connected with the shaping layer 312 by a back gap portion 316. The shaping layer 312, return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by an electrically insulating material 320 that electrically insulates the turns of the coil 317 from one another and electrically isolates the coil 317 from the surrounding magnetic structures 310, 312, 316, 314. When a current passes through the coil 317, the resulting magnetic field causes a magnetic flux to flow through the return pole 314, back gap 316, shaping layer 312 and write pole 310. This magnetic flux causes a write field 321 to be emitted toward an adjacent magnetic medium. The shaping layer 312 is also surrounded by an insulation layer 321 which separates the shaping layer 312 from the ABS. The insulation layers 320, 321, 311 can all be constructed of the same material, such as alumina ($Al_2O_3$) or of different electrically insulating materials.

Figure 4:
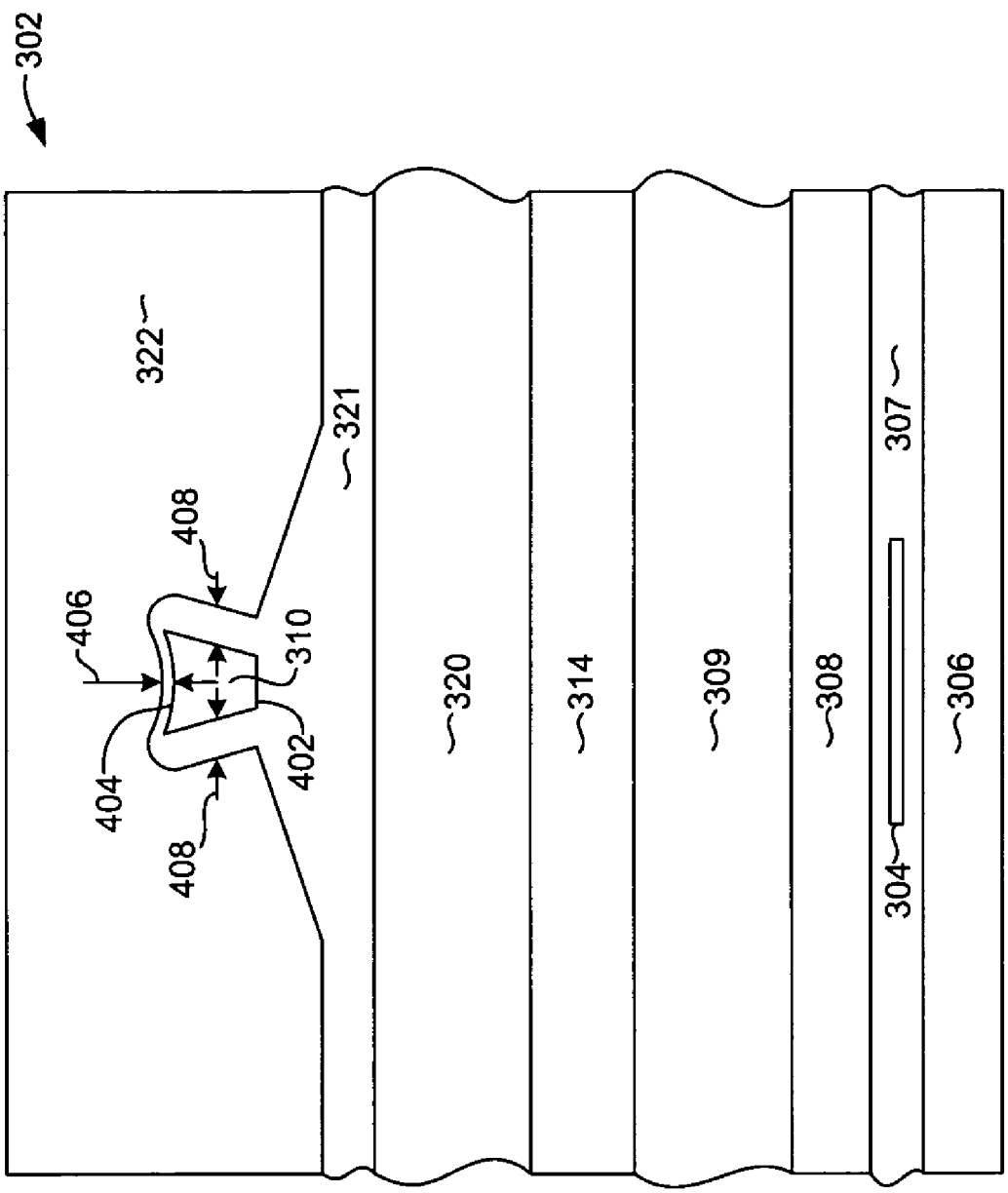
FIG. 4 is an ABS view of the write head taken from line 4-4 of FIG. 3.
Figure 13:
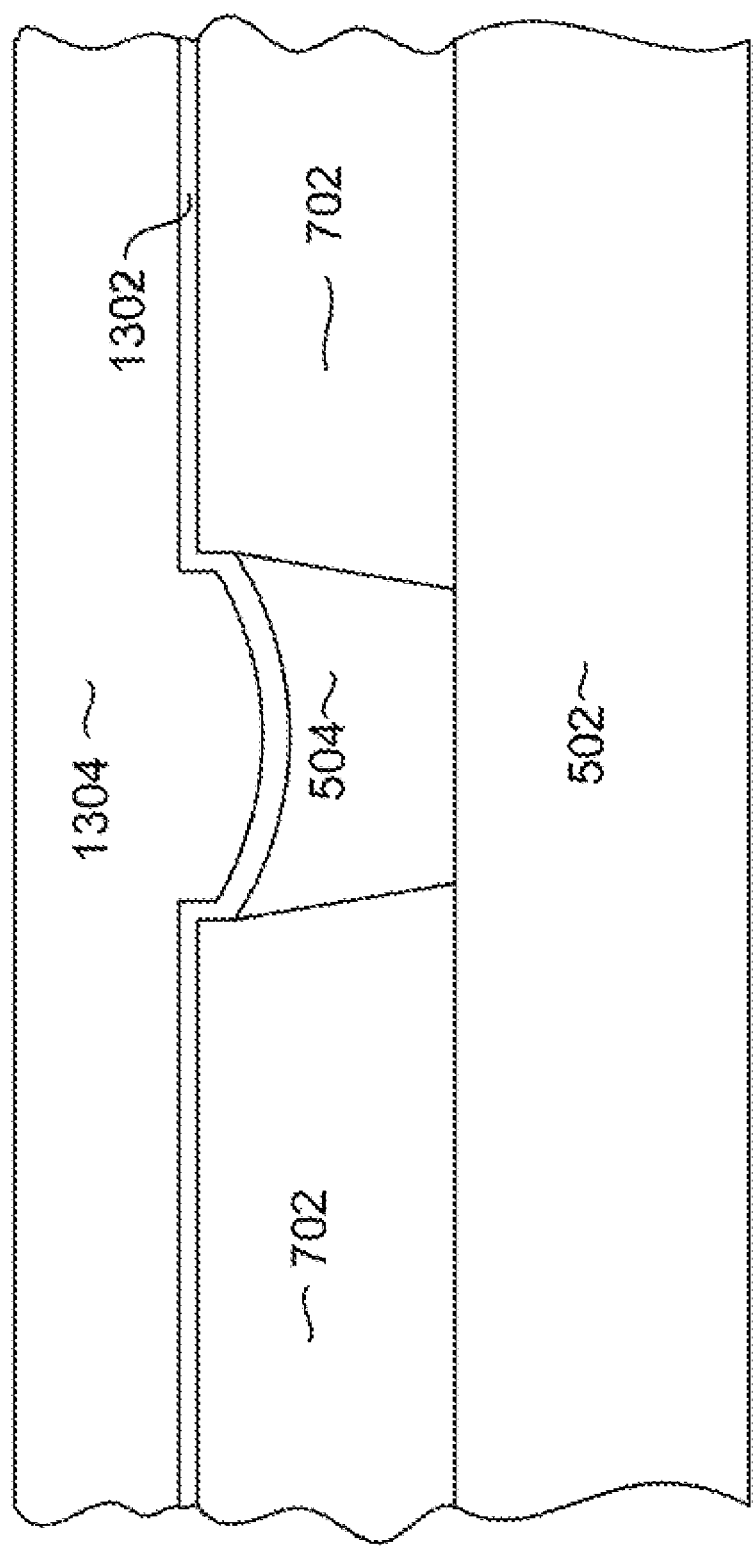

The write head element 302 also includes a trailing shield 322, which can be constructed of a magnetic material such as NiFe or some other material. With reference to FIG. 4, the trailing shield 322 may be configured to wrap around the write pole 310 to provide side shielding as well as trailing shielding from stray magnetic fields. These stray magnetic fields can be from the write head 302 itself, or could also be from adjacent track signals or from magnetic fields from external sources. Alternatively, the trailing shield 322 can be constructed such that it does not wrap around the sides of the write pole 310, providing a purely trailing shield function. Such a write pole is shown illustrated in FIG. 13, wherein the trailing shield 1304 extends laterally outward without extending down over the sides of the write pole 504. This embodiment and a method for manufacturing it will be discussed further herein below.

With continued reference to FIG. 4, the write pole 310 has a leading edge 402 and a trailing edge 404. The write pole is preferably narrower at the leading edge 404 than at the trailing edge, forming the write pole with a tapered or trapezoidal shape. The trailing edge 404 can be provided with a concave shape. This curvature of the trailing edge 404 improves transition curvature, thereby improving performance of the write element 302. The trailing shield 322 is separated from the trailing edge of the write pole 310 by a trailing gap 406, and (if provided with side shielding) is separated from each side of the write pole 310 by a side gap 408. As mentioned above, the thickness of the trailing shield gap 406 is critical and must be carefully controlled. The side gaps 408 are preferably thicker than the trailing gap 406 and, although the side gap thickness must also be well controlled, the thickness of the side gap 406 does not need to be as tightly controlled as the thickness of the trailing gap 406.

The trailing gap 406 preferably has a thickness of about half of the distance between the write pole 310 and the magnetically soft underlayer of the magnetic medium (not shown) when the head 302 is in use. Therefore, the trailing gap 406 can have a thickness of 20-60 nm or about 40 nm. The side gap can have a thickness of 40-140 or about 90 nm.

Method for Constructing a Write Pole with a Concave Trailing Edge

With reference now to FIG. 5-13, a method for constructing a write head 302 according to an embodiment of the invention is described. FIGS. 5-13 illustrate the construction of the write pole 310 and trailing shield 322 described earlier with reference to FIGS. 3 and 4. The following described method assumes that other portions of the head 302 such as the return pole 314 and coil 317 have already been constructed.

Figure 5:
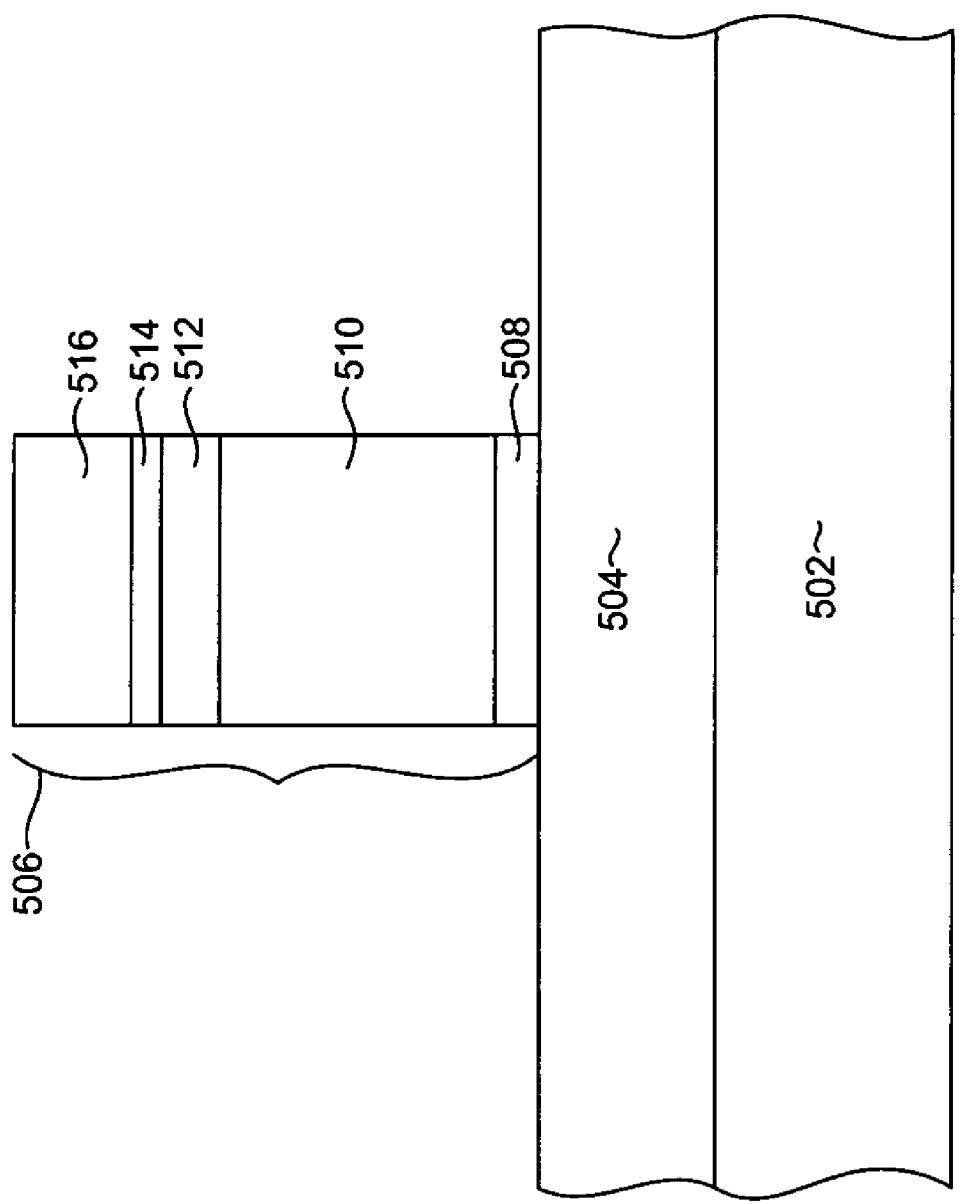
FIGS. 5-13 are views of a write head in various intermediate stages of manufacture illustrating a method of manufacturing a write head according to a possible embodiment of the invention.

With reference then to FIG. 5, a substrate 502 is provided, which may include all or a portion of the insulation layer 320 and/or shaping layer 312 described earlier with reference to FIG. 3. A magnetic write pole material 504 is deposited over the substrate. The write pole material 504 can be a single layer of magnetic material, but is preferably a lamination of layers of magnetic material such as CoFe separated by thin layers of non-magnetic material such as Cr or NiCr.

A mask structure 506 is formed over the write pole material 504. The mask structure 506 can include a thin hard mask layer 508 constructed of alumina ($Al_2O_3$), which will be referred to as a thin alumina layer 508. The thin alumina layer 508 can be deposited 20-80 nm thick or about 50 nm thick. The mask structure also includes a first image transfer layer 510 which can be constructed of a soluble polyimide material such as DURAMIDE®. The first image transfer layer 510 can be relatively thick, such as 1000-1400 nm thick or about 1200 nm thick. A second hard mask 512 can be provided above the first image transfer layer 510. The second hard mask layer can be constructed of silicon-dioxide ($SiO_2$) and can have a thickness of 50-150 nm or about 100 nm. A second image transfer layer 514 can be provided above the second hard mask layer 512. The second image transfer layer can also be constructed of a soluble polyimide solution such as DURAMIDE® and can be 50-130 nm thick or about 90 nm thick. A mask patterning layer 516 such as a silicon containing imaging photoresist material such as TIS® is provided at the top of the mask structure 506.

The mask structure 506 can be formed by photolithographically patterning the mask layer 516. A material removal process such as reactive ion etching (RIE) can be performed to transfer the image of the mask layer 516 onto the underlying layers. This RIE will likely remove all or a portion of the upper mask layers 514, 516 leaving the layers 508, 510, 512.

Figure 6:
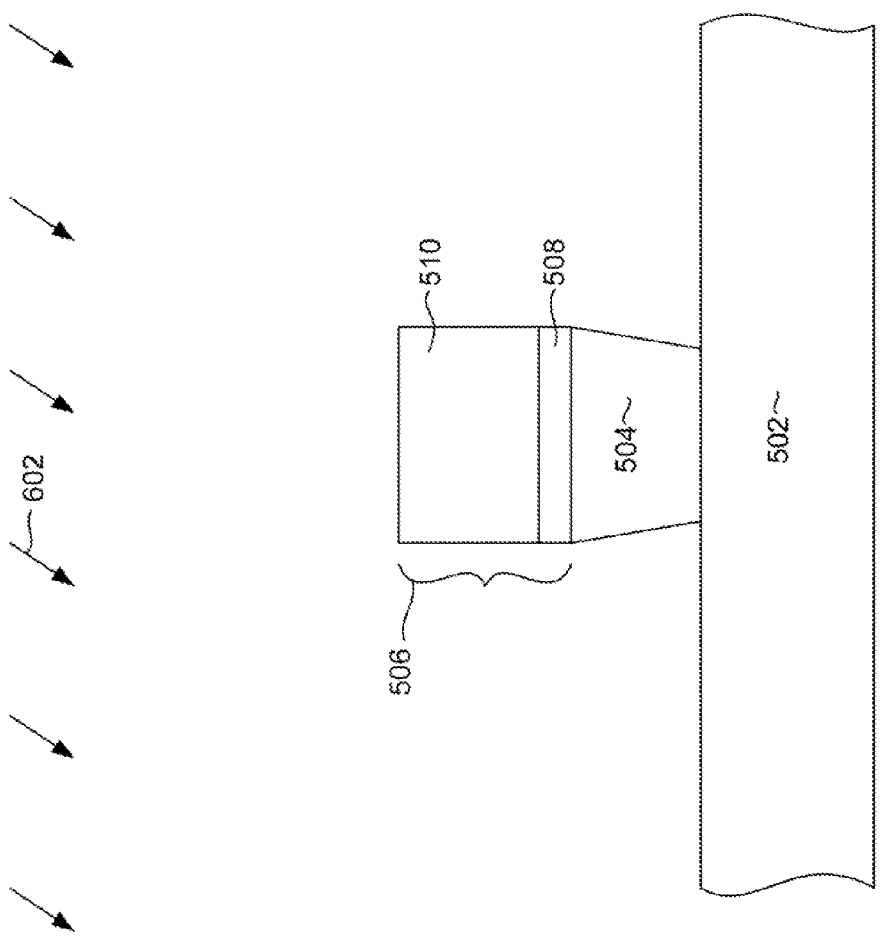

With reference to FIG. 6, an ion mill 602 is performed to remove portions of the write pole material 504 that are not covered by the mask structure 506, thereby forming the write pole 504. The ion mill 602 is preferably performed at one or more angles (with respect to normal), in order to form the write pole 504 with a desired trapezoidal shape. The ion mill may remove the second hard mask 512 and a portion of the first image transfer layer 510, leaving the first hard mask and a remaining portion of the first image transfer layer 510.

Figure 7:
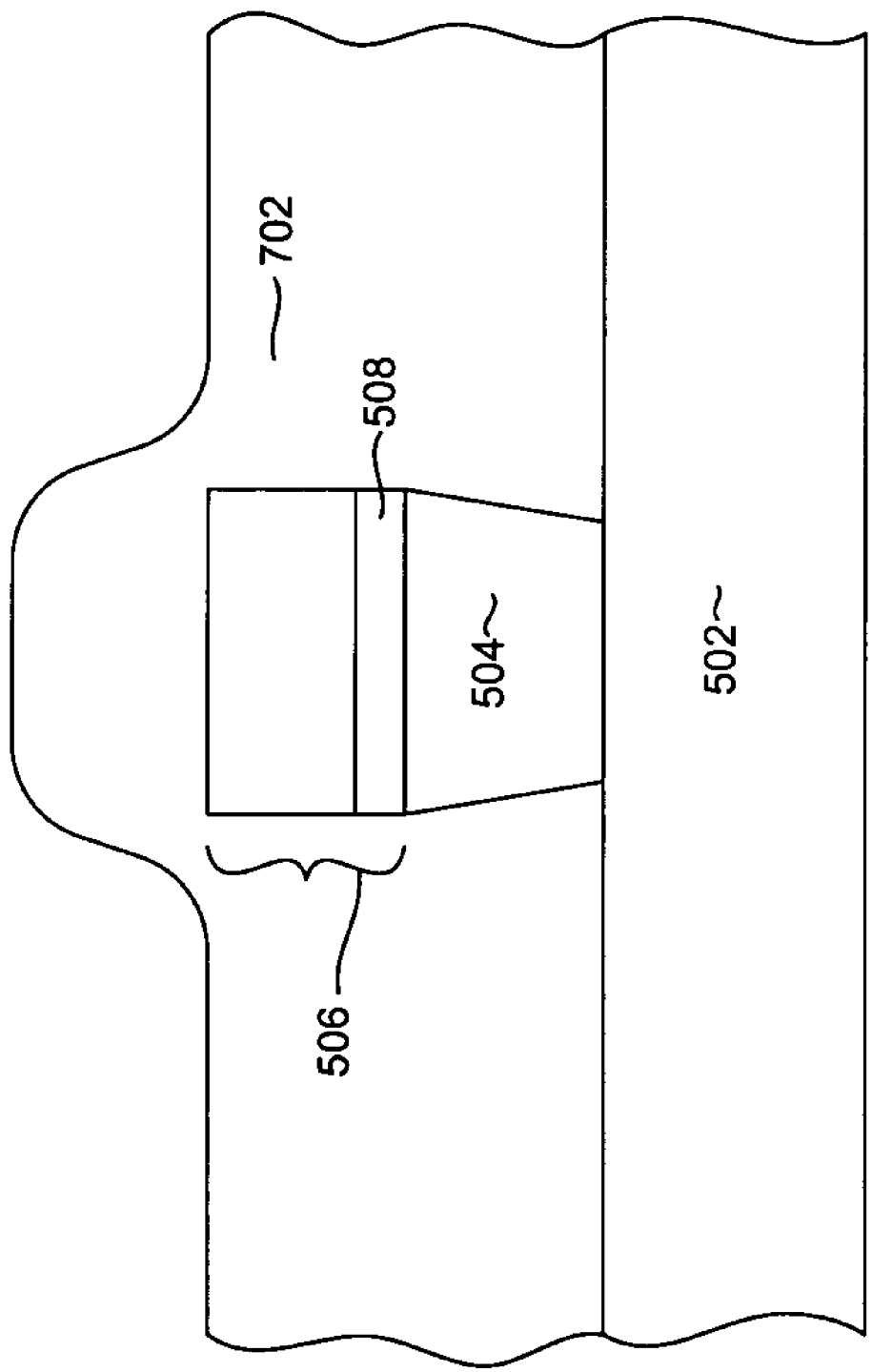
Figure 8:
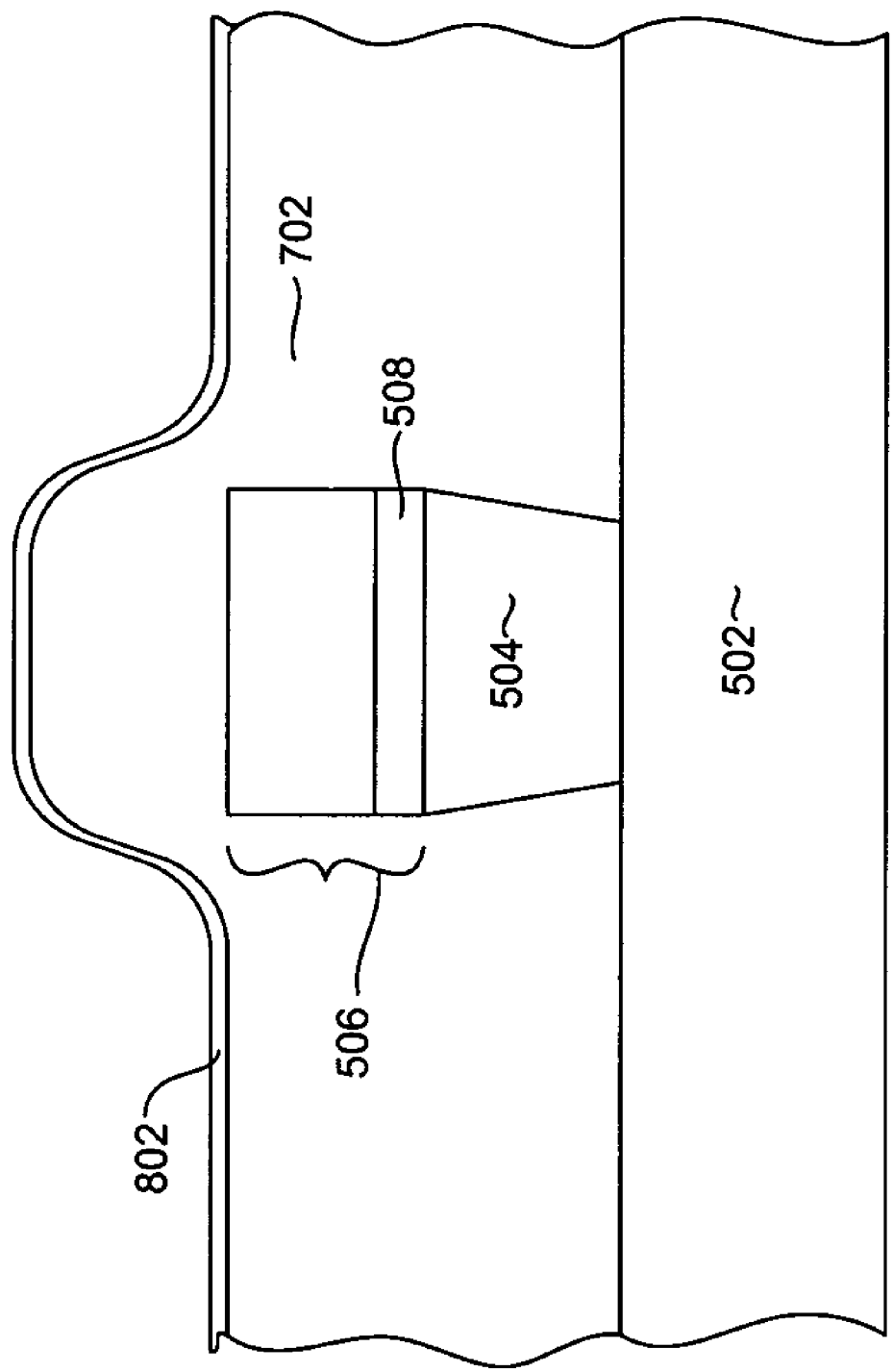

With reference now to FIG. 7, a thick layer of alumina 702 is deposited. This alumina layer 702 can be deposited by a conformal deposition process such as atomic layer deposition (ALD), chemical vapor deposition (CVD), etc. or by a more conventional deposition process such as sputter deposition. With reference to FIG. 8, a thin layer of material that is resistant to chemical mechanical polishing (CMP stop layer 802) is deposited. The CMP stop layer 802 can be, for example, diamond like carbon (DLC).

Figure 9:
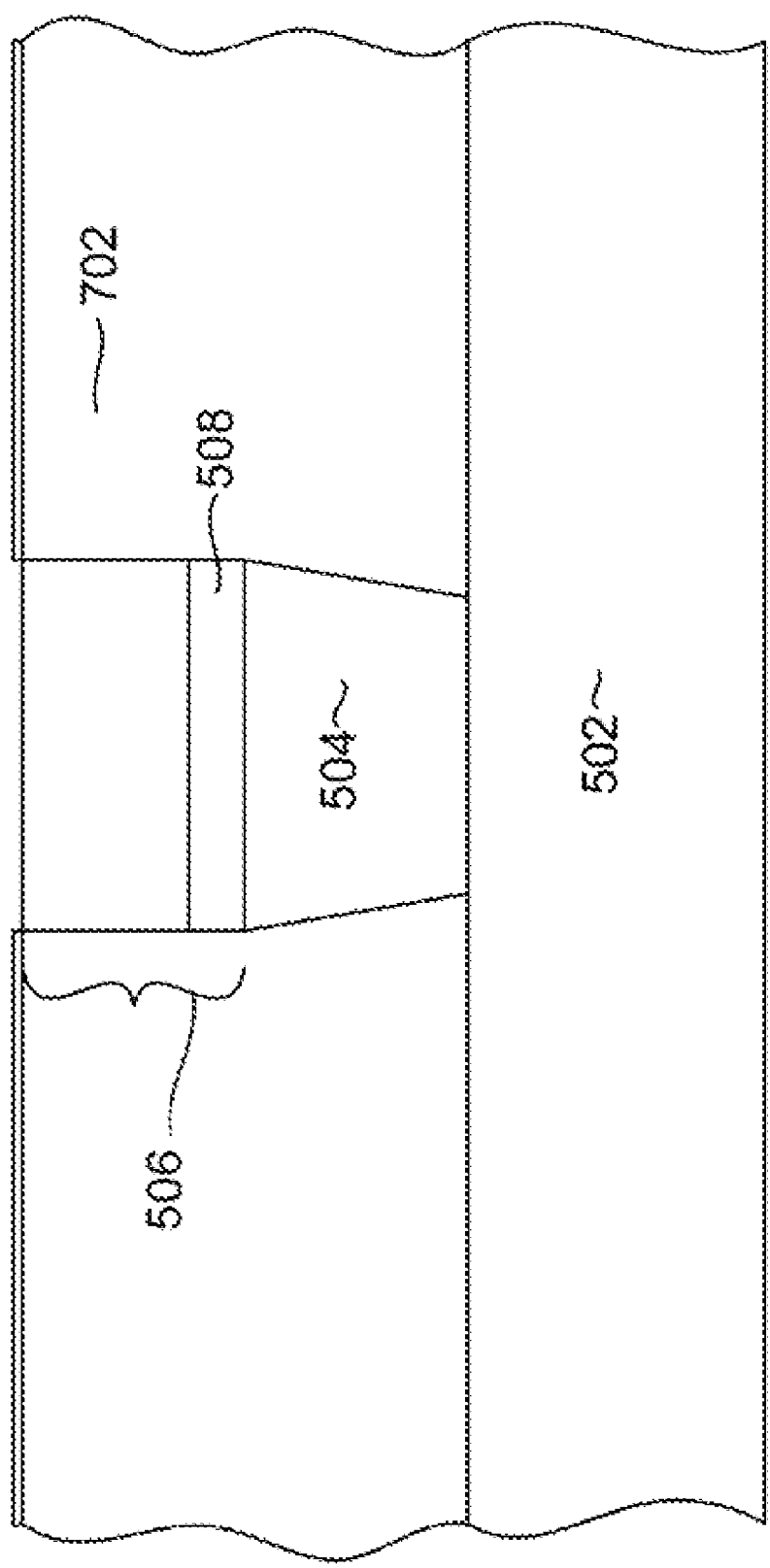

With reference now to FIG. 9 a chemical mechanical polish (CMP) is performed to remove the alumina bump from over the write pole 504, exposing the remaining mask structure 506. Then, with reference to FIG. 10, a reactive a reactive ion milling 1002 may be performed to remove a portion of the alumina layer 702. The reactive ion mill preferentially removes the alumina layer 702, but also removes a portion of the image transfer layer 510.

Figure 11:
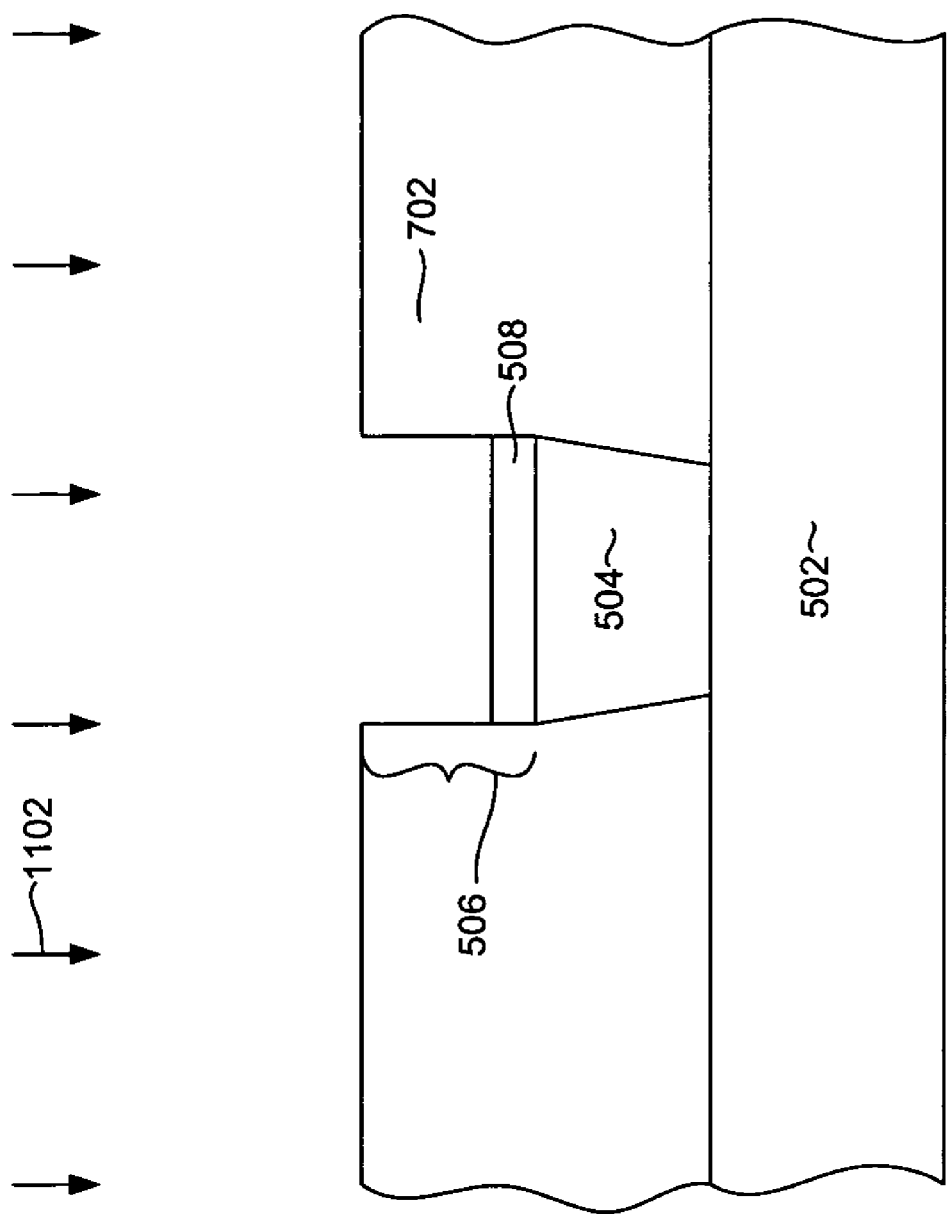

With reference to FIG. 11, a Reactive Ion Etch (RIE) 1102 is performed to remove the remaining image transfer layer 510, exposing the underlying thin alumina mask layer 508. Then, with reference to FIG. 12, a Reactive Ion Mill (RIM) 1202 is performed. The RIM 1202 is performed in an atmosphere that contains $CHF_3$ and Ar. This RIM 1202 preferentially removes alumina having an $Al_2O_3$/CoFe selectivity off approximately 10:1. The RIM 1202 can be performed using a low rate process and an end point detection scheme. Optionally a short Ar mill can be performed after the RIM 1202 to clean up the write pole 504. It can be seen that the RIM 1202 forms a concave upper surface on the top (trailing edge) of the write pole 504. As mentioned above with reference to FIG. 3, this concave surface improves performance of the write pole.

Figure 10:
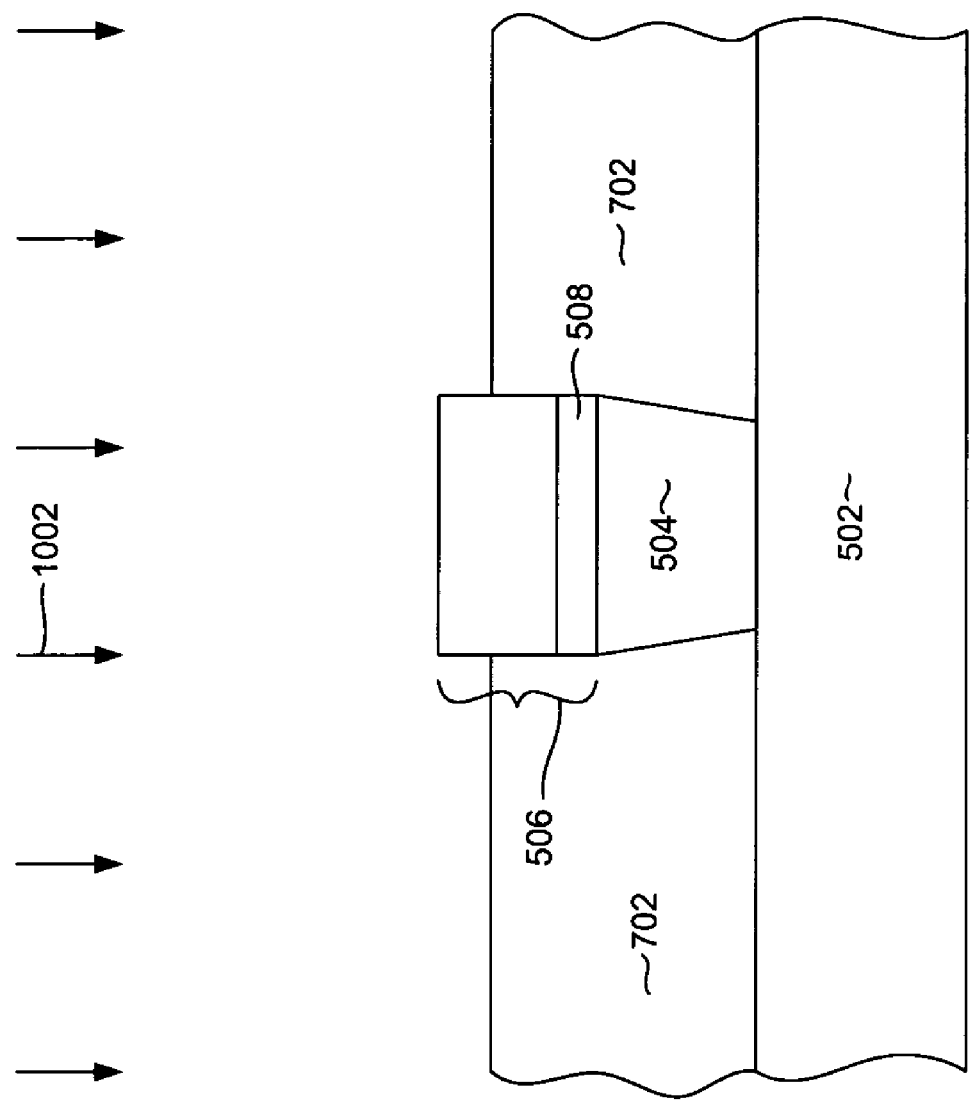
Figure 12:
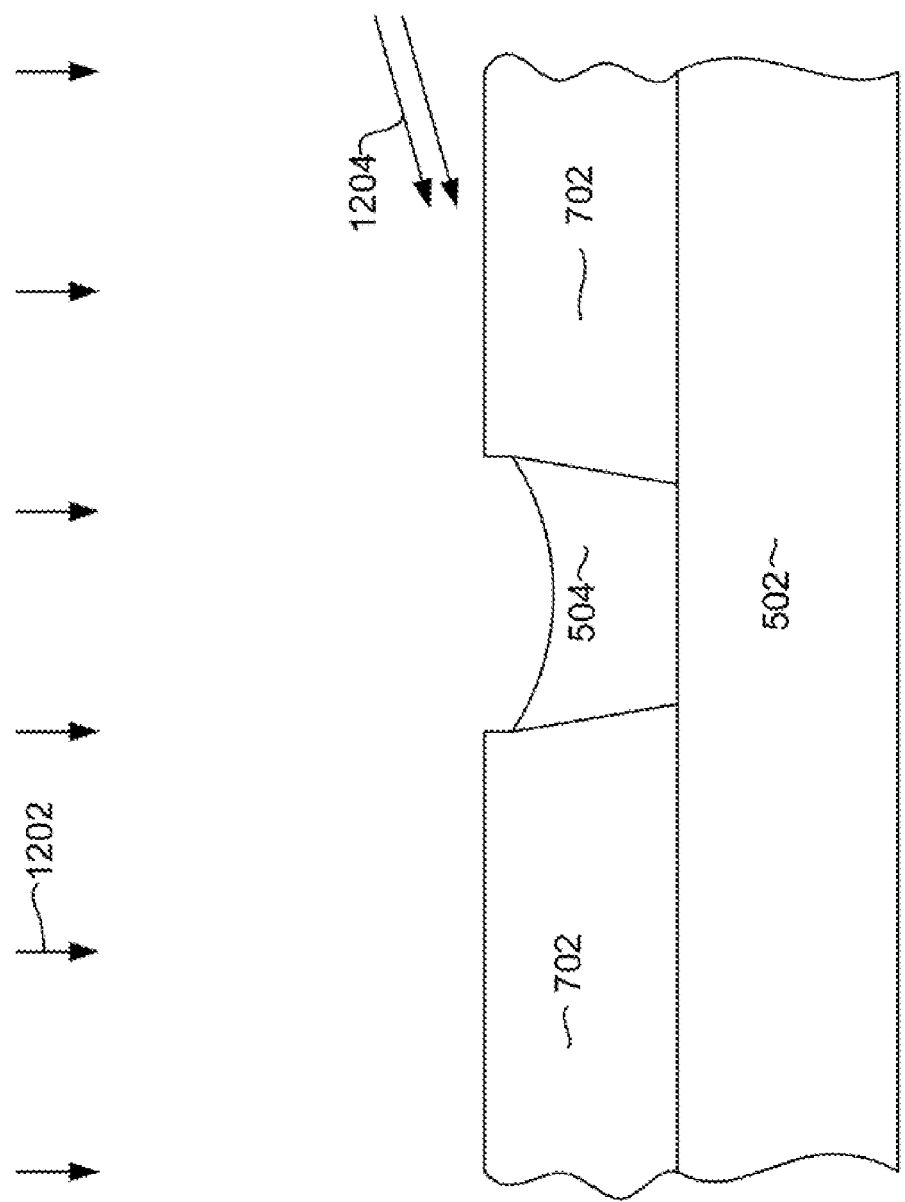

FIGS. 10-12 can also be used to describe an alternate method. With reference to FIG. 10, the material removal process 1002 is a Reactive Ion Mill (RIM) 1002 performed substantially normal to the layers (ie. substantially vertical). The RIM 1002 is performed with a reactive gas such as $CHF_3$. Then, with reference to FIG. 11, the material removal process 1102 is a reactive ion etch RIE, or reactive ion mill RIM performed in a reactive gas such as $O_2$ and is also performed at a substantially normal orientation (ie. vertical). Then, with reference to FIG. 12, an ion mill 1204 is performed in an Ar chemistry, at a glancing angle (ie. at an angle of 60-85 with respect to normal). This glancing ion mill takes advantage of shadowing effects of the remaining alumina 702 to prevent waviness in the surface of the write pole 504 in the region of the pole tip.

With reference now to 13, a non-magnetic, electrically conductive seed layer 1302 such as Rh is deposited. This seed layer is deposited to a thickness to define a trailing shield gap as described above with reference to FIG. 3. Accordingly, the non-magnetic, electrically conductive seed layer 1302 is deposited to a thickness of 20-60 nm or about 40 nm. After the seed layer 1302 has been deposited, a magnetic material 1304 such as NiFe can be deposited by electroplating to form a trailing shield.

Method for Constructing a Trailing Shield with a Well Defined Trailing Gap and Write Pole Definition With reference now to FIGS. 14-19, a method for constructing a perpendicular magnetic write head is described. As with the previously described method, the method described in FIGS. 14-19 focuses on the construction of a write pole and trailing shield and assumes that other portions of the write head have been previously constructed.

Figure 14:
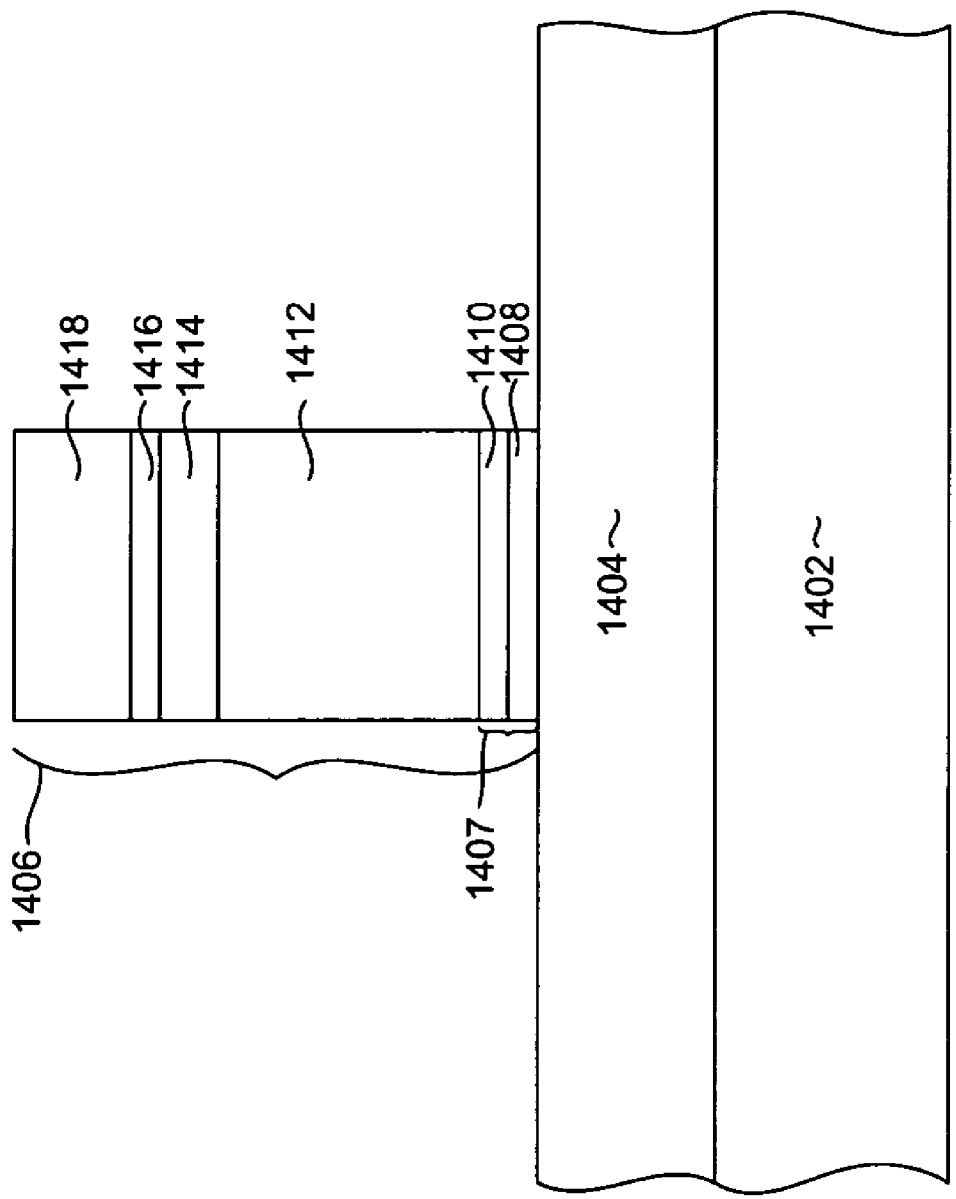
FIGS. 14-19 are views of a write head in various intermediate stages of manufacture illustrating a method of manufacturing a write head according to another possible embodiment of the invention.

With particular reference to FIG. 14, a substrate 1402 is provided, which may include an insulation layer 321 and shaping layer 312 (FIG. 3). A layer of magnetic write pole material 1404 is deposited on the substrate and as describe above, is preferably a laminate of magnetic layers separated by thin non-magnetic layers. A mask structure 1406 is constructed and includes a bi-layer first (or bottom) hard mask 1407 that includes a first or bottom layer 1408 constructed of alumina ($Al_2O_3$). The first layer can have a thickness of 20-40 nm or about 30 nm. The bi-layer bottom hard mask 1407 also includes a second layer constructed of material that is resistant to chemical mechanical polishing such as diamond like carbon (DLC) layer 1410. A first image transfer layer 1412, which can be constructed of a soluble polyimide such as DURAMIDE®, is formed over the bi-layer hard mask. A second hard mask 1414, constructed of, for example $SiO_2$ is formed over the first image transfer layer, and a second image transfer layer 1416 is formed over the second hard mask 1414. A resist mask 1418 such as photoresist or thermal image resist is formed over the second image transfer layer 1416. It can be seen that the mask structure described in FIG. 14 is similar to the mask structure 506 of FIG. 5, except for the addition of the bi-layer hard mask 1407. The mask structure 1406 can be formed by depositing the various mask layers and then photolithographically patterning the resist mask 1418 and performing one or more material removal processes such as reactive ion etching (RIE) to transfer the image of the resist mask onto the underlying layers.

Figure 15:
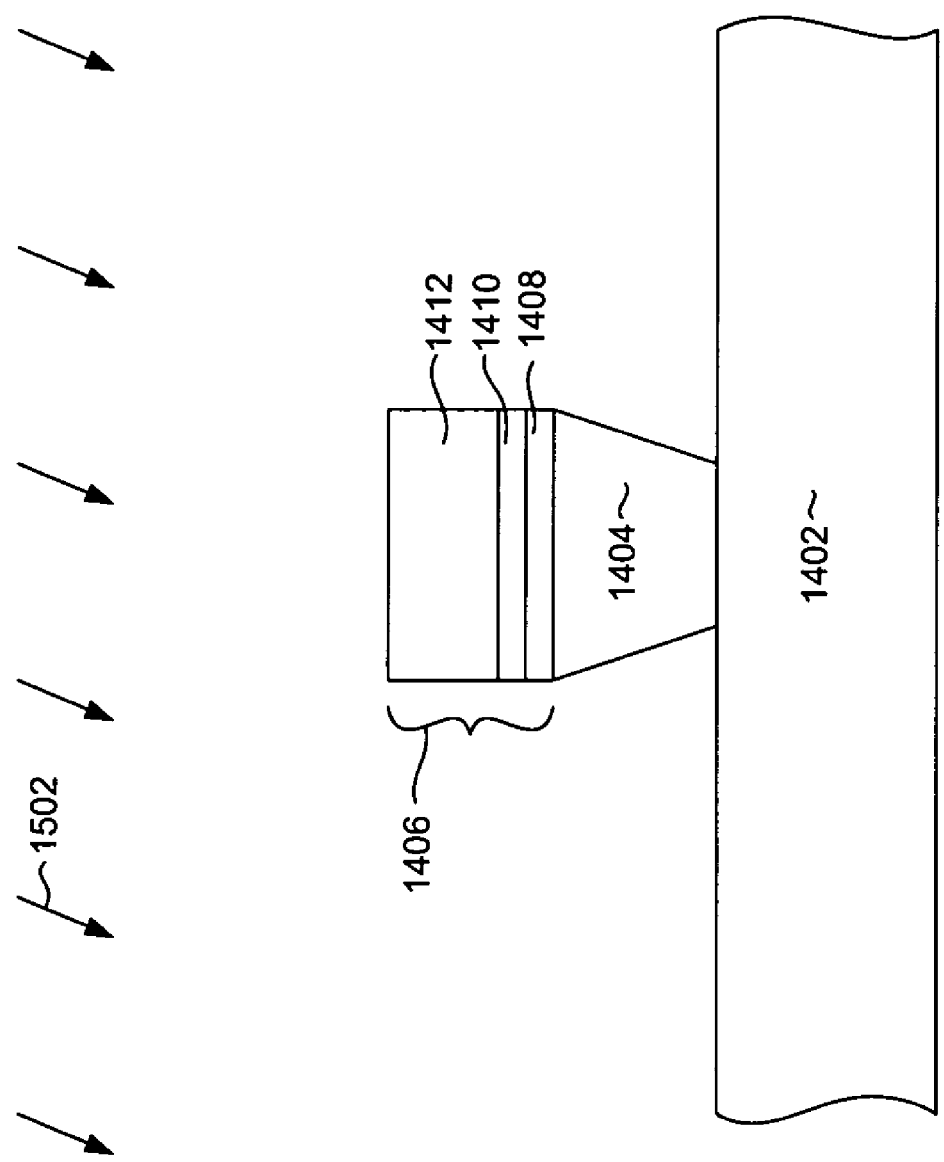
Figure 16:
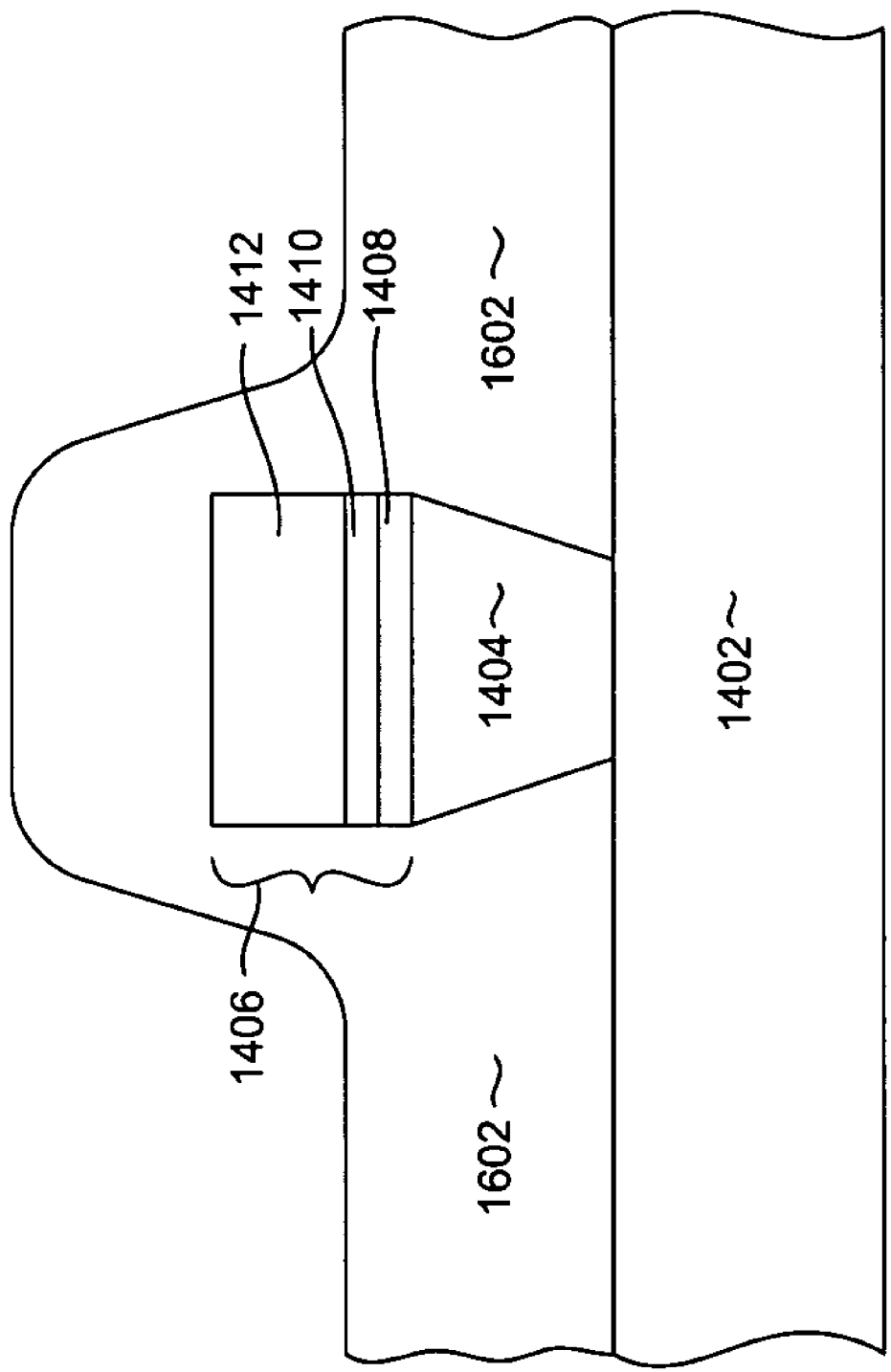
Figure 17:
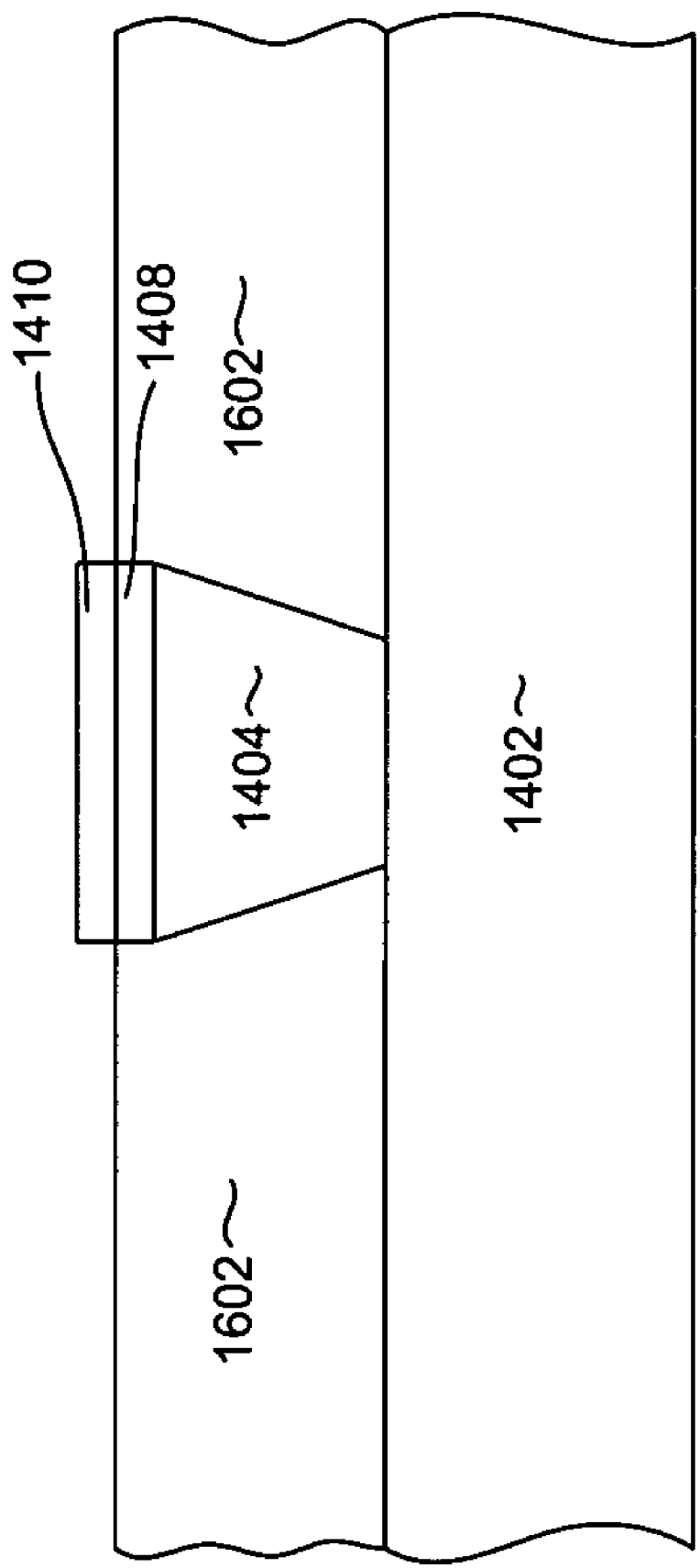

With reference now to FIG. 15, an ion mill 1502 is performed to form the write pole 1404. The ion mill 1502 is performed at one or more angles relative to normal to form the write pole 1404 with a desired trapezoidal shape. Then, with reference to FIG. 16, a thick layer of alumina 1602 is deposited. With reference to FIG. 17, a chemical mechanical polish (CMP) is performed sufficiently to expose the DLC layer 1410. Since the DLC layer 1410 is very resistant to CMP it makes an excellent CMP stop layer.

Figure 18:
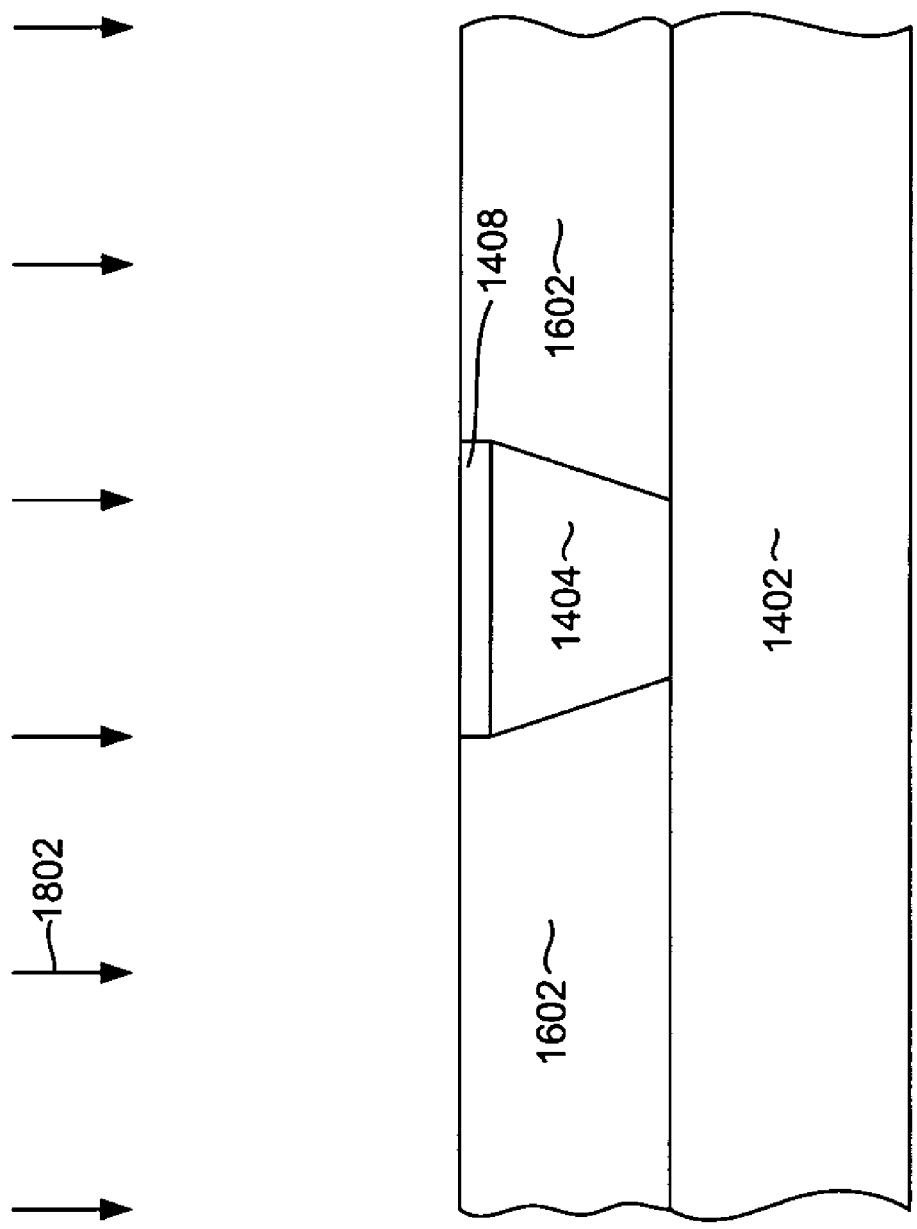
Figure 19:
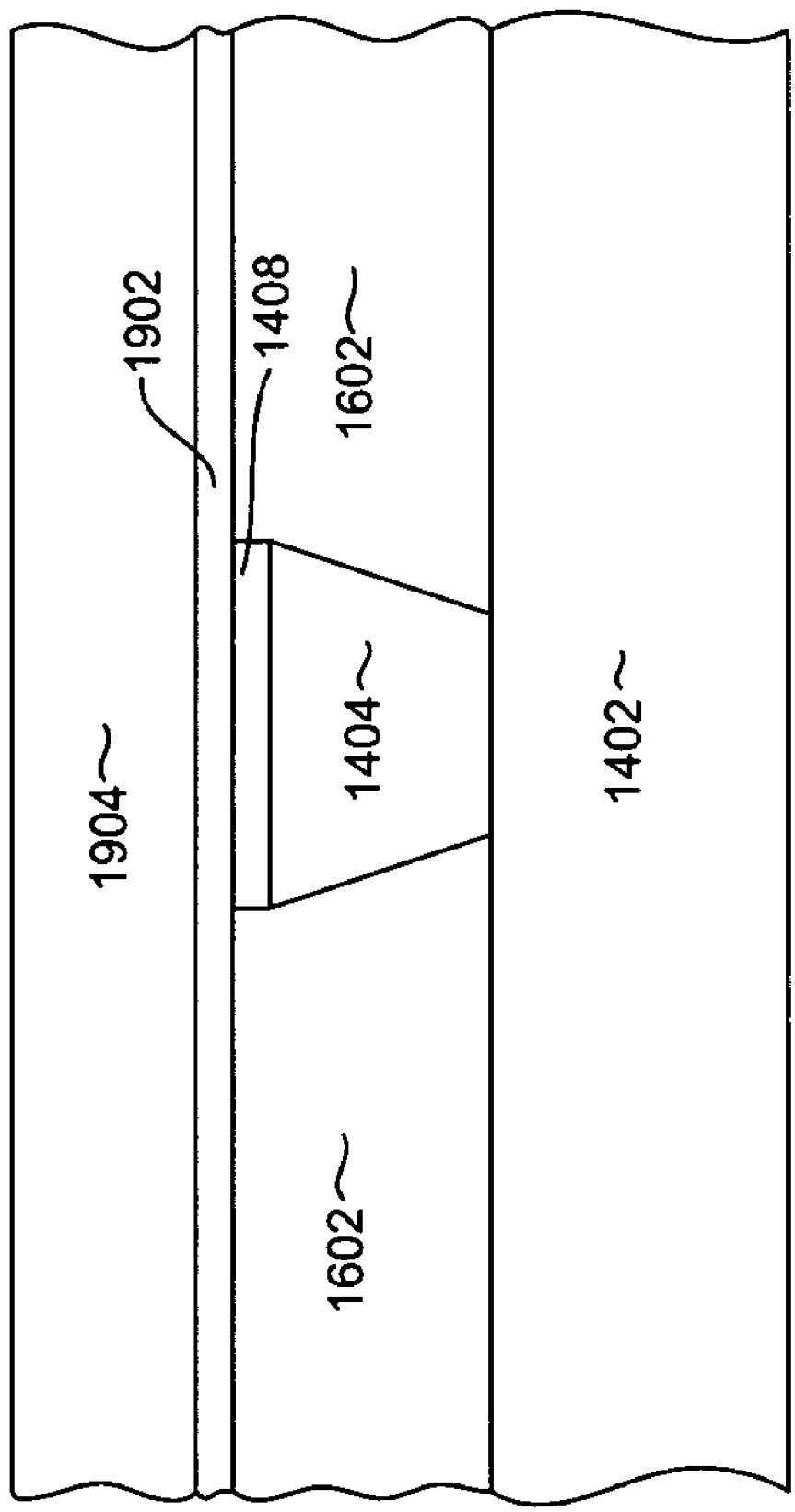

Then, with reference to FIG. 18, a reactive ion etch (RIE) 1802 is performed to remove the DLC layer 1410. With reference to FIG. 19, an electrically conductive, non-magnetic seed layer such as Rh is deposited. A magnetic material 1904 can then be deposited to form a magnetic trailing shield. The trailing shield gap will be defined by the sum or the thickness of the first hard mask layer 1408 (which can be alumina or Rh) and the seed layer 1902. It can be seen that the process described with reference to FIGS. 14-19 forms a write head having a trailing shield that does not wrap around the write head and provides a process for accurately controlling the thickness of the trailing shield gap.

Figure 20:
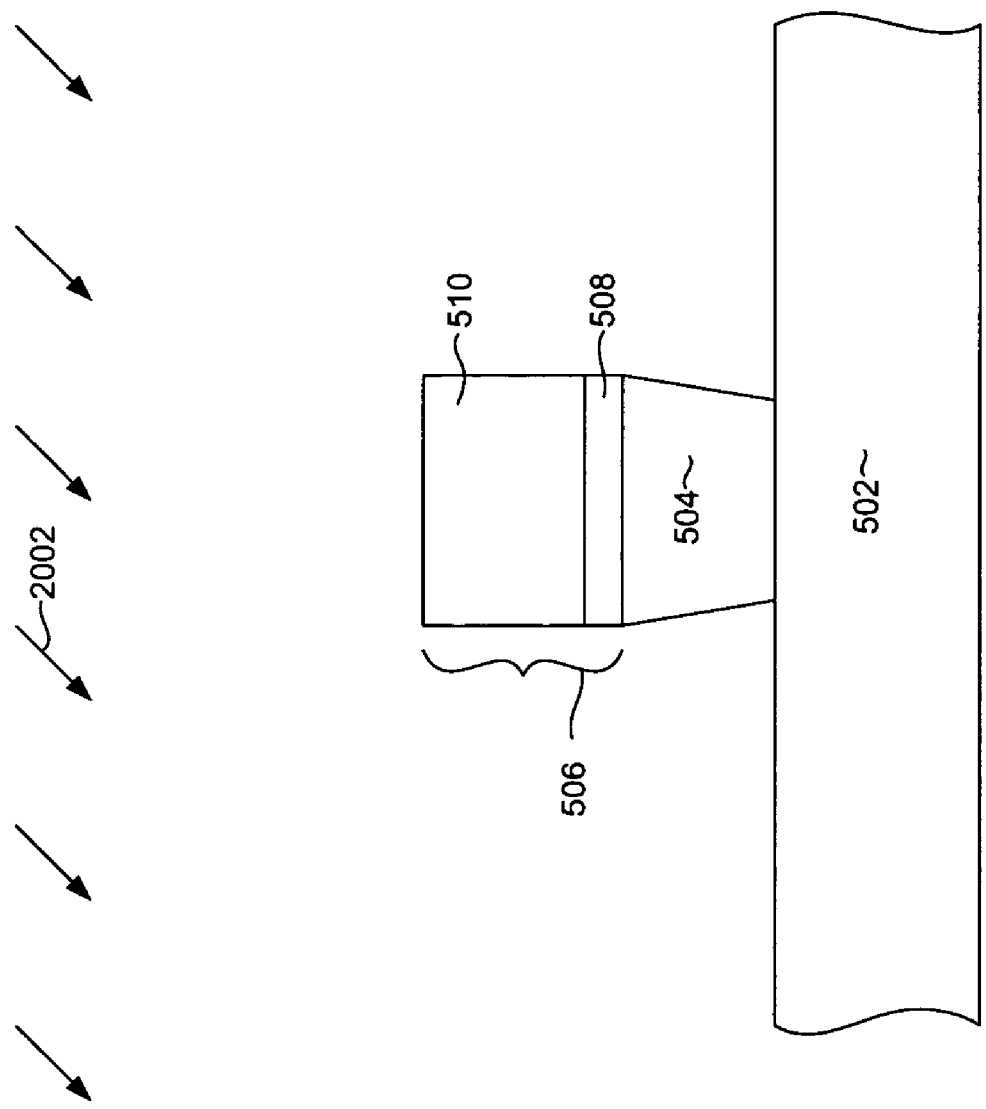
FIGS. 20-26 are views of a write head in various intermediate stages of manufacture illustrating a method of manufacturing a write head according to another possible embodiment of the invention.
Figure 21:
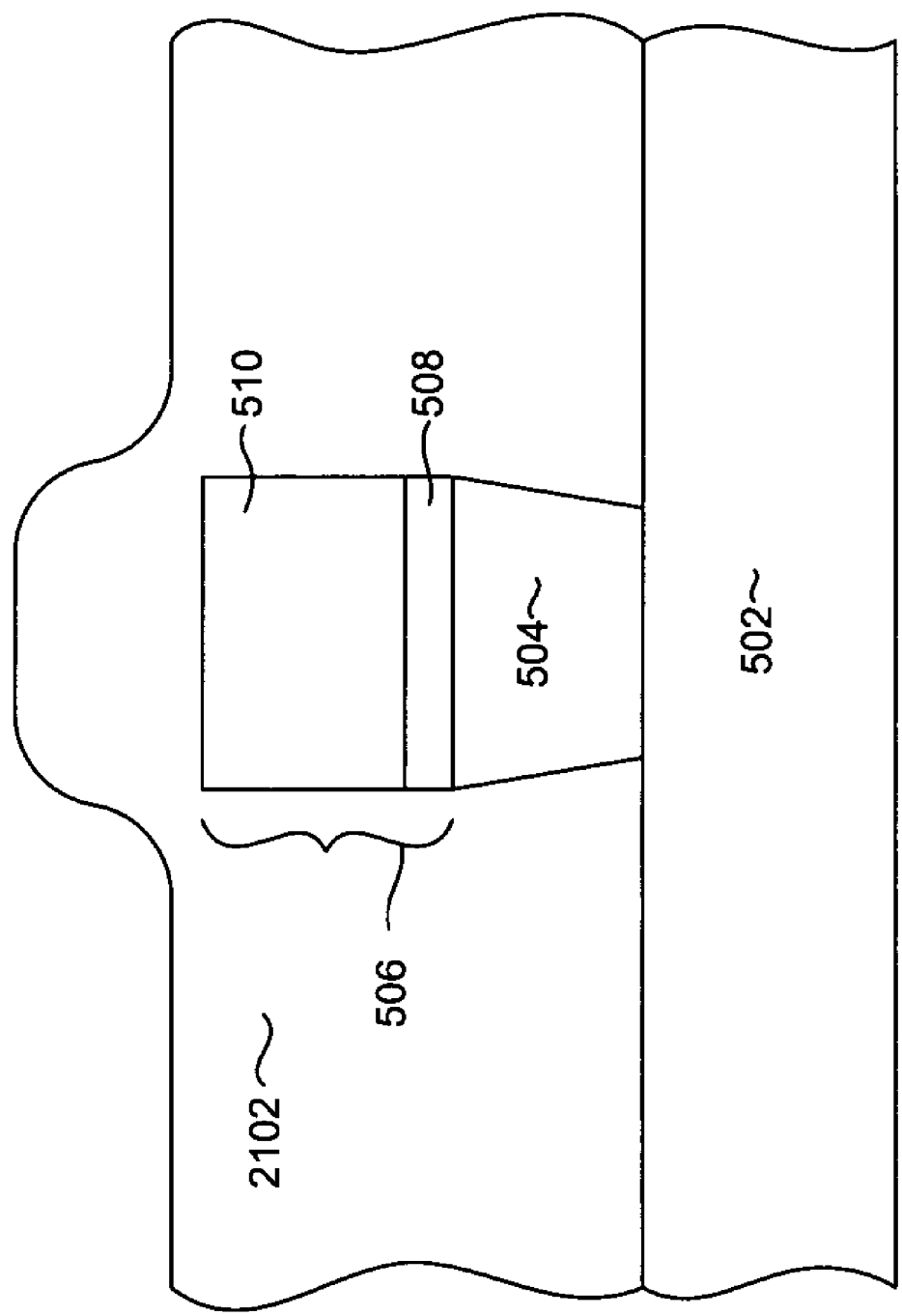
Figure 22:
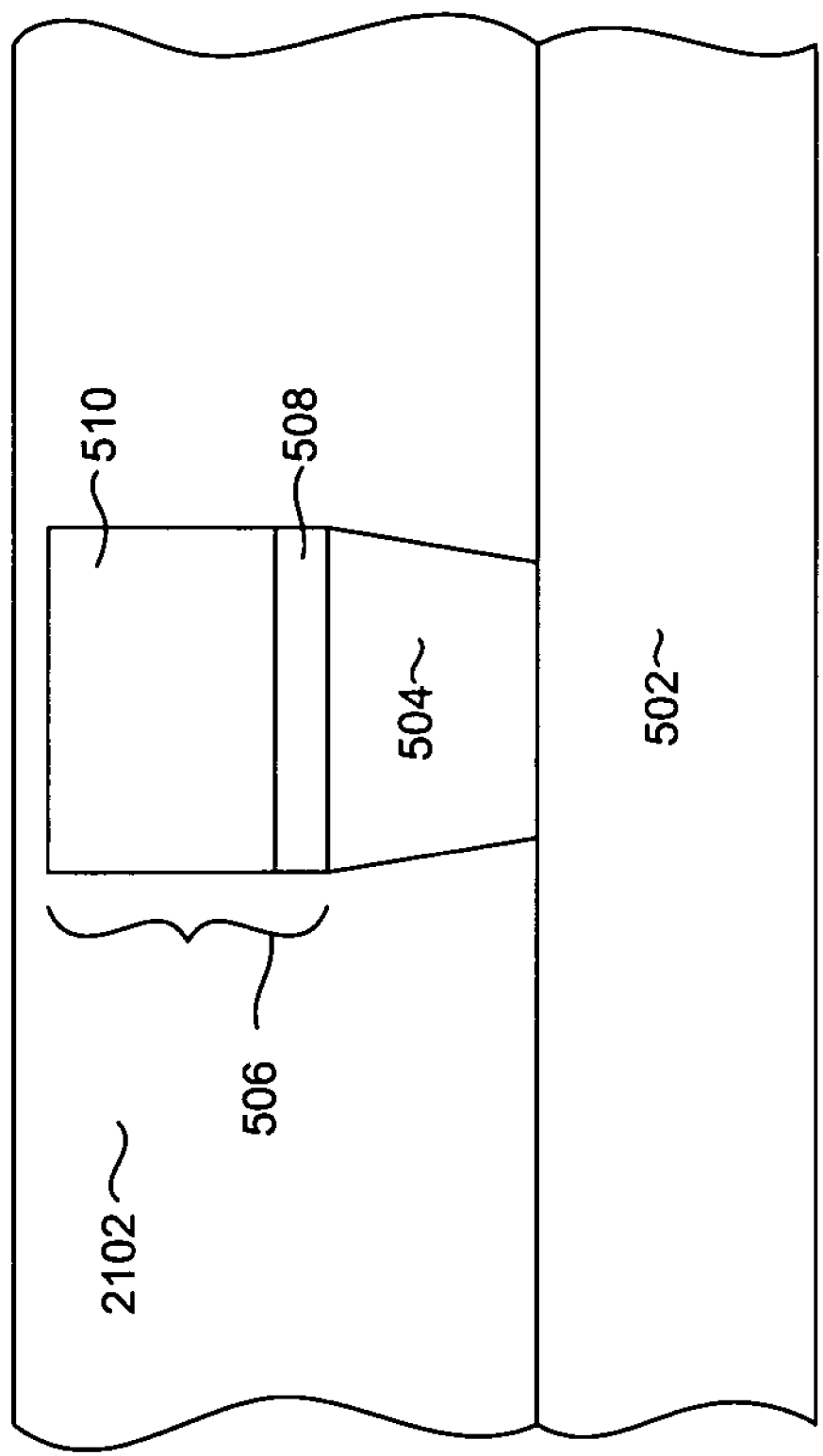

Method for Manufacturing a Perpendicular Write Head Having a Trailing Shield with a Trapazoidal Notch Profile With reference now to FIGS. 20-26, a method is described for constructing a write head having a magnetic trailing shield with an angled or beveled notch formed adjacent to each side of the write pole. With particular reference to FIG. 20, a write pole 504 is formed on a substrate 502 using a mask structure 506 and an ion mill process 2002. The structure formed in FIG. 20 is constructed by the methods described above with reference to FIGS. 5-6, except that the thin alumina layer 508 is preferably deposited to a thickness of 10-30 nm or about 20 nm thick. With reference to FIG. 21, a thick layer of non-magnetic fill material (such as an alumina fill) 2102 is deposited. This alumina fill 2102 can be deposited to a thickness of about 1 to 3 um or about 1.5 um (sufficient to cover the write pole 504 and remaining mask 506). With reference to FIG. 22 a short, gentle chemical mechanical polish (touch CMP) is performed to planarize the alumina fill layer 2102. The mask 506 can remain buried in the alumina fill layer 2102.

Figure 23:
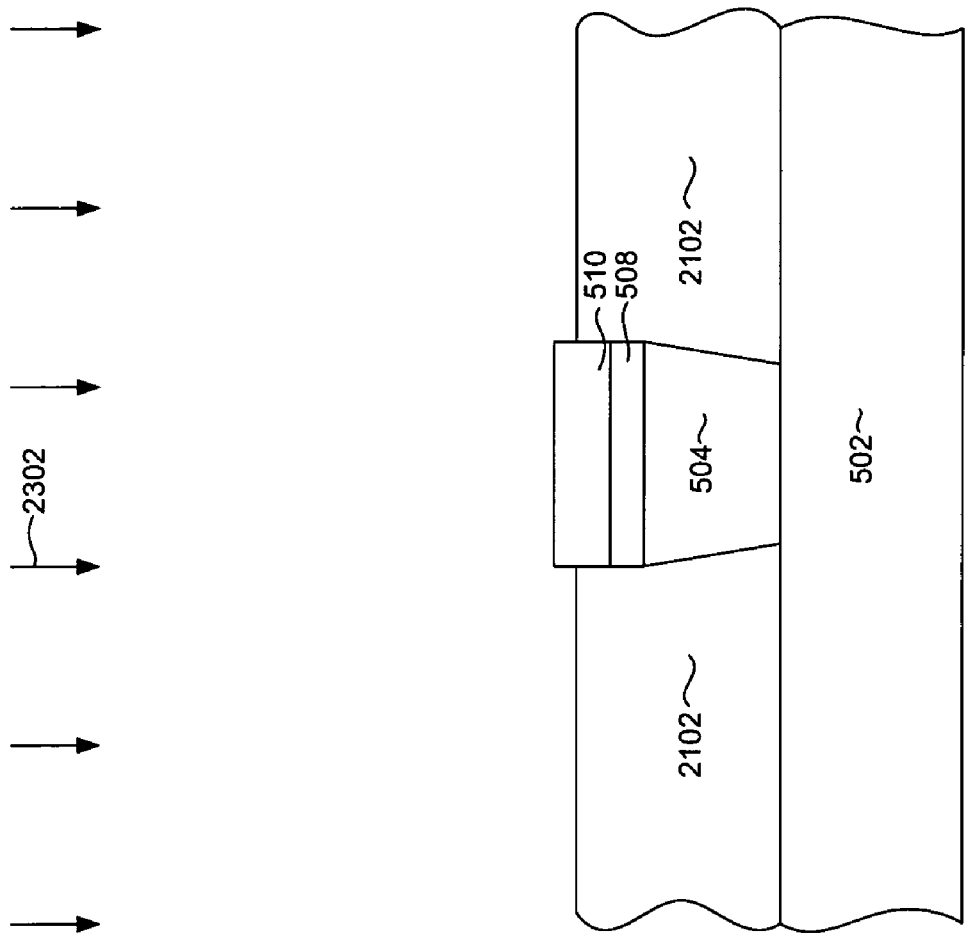
Figure 24:
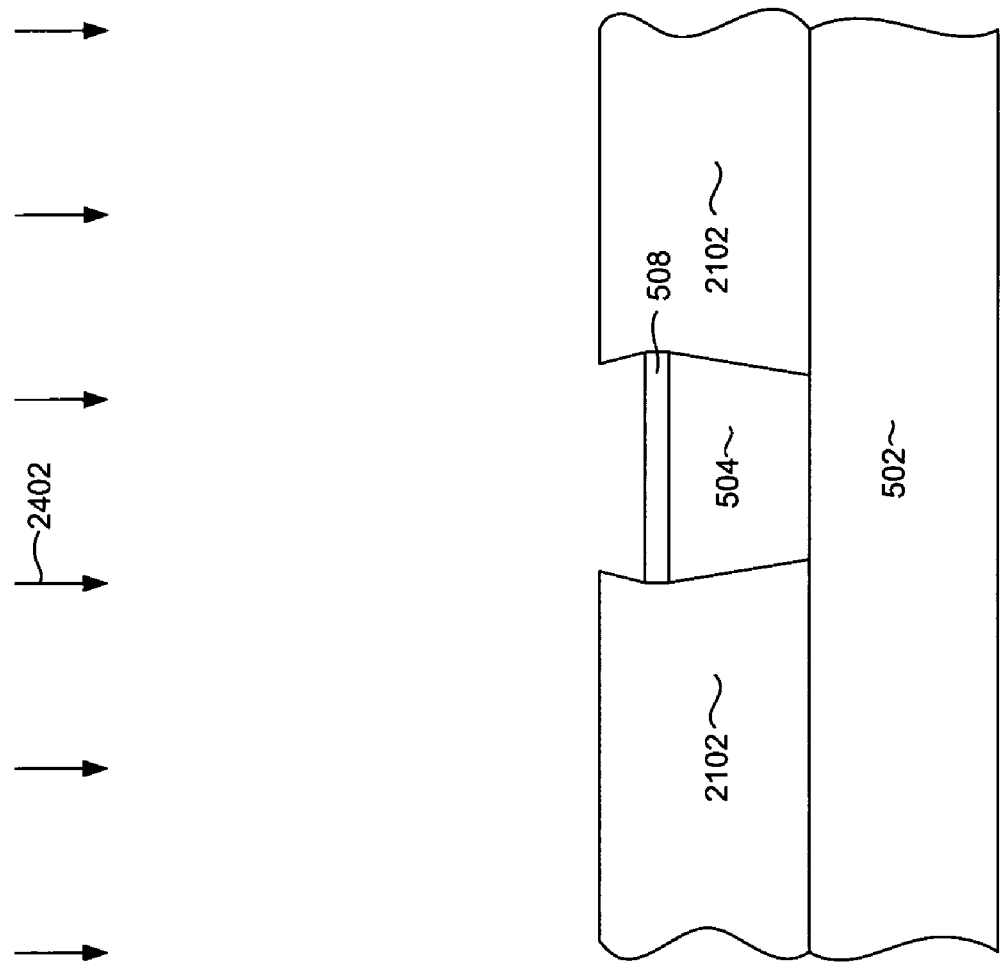

Then, with reference to FIG. 23, a reactive ion beam etch (RIBE) 2302 is performed to remove the alumina fill layer 2102 until the surface of the fill layer 2102 is about 60-120 nm or about 90 nm above the top (leading edge) of the write pole 504. Then, with reference to FIG. 25, a reactive ion etch (RIE) 2402 is performed sufficiently to remove any remaining image transfer layer 510 (DURAMIDE® layer), leaving the thin alumina layer 508 exposed.

Figure 25:
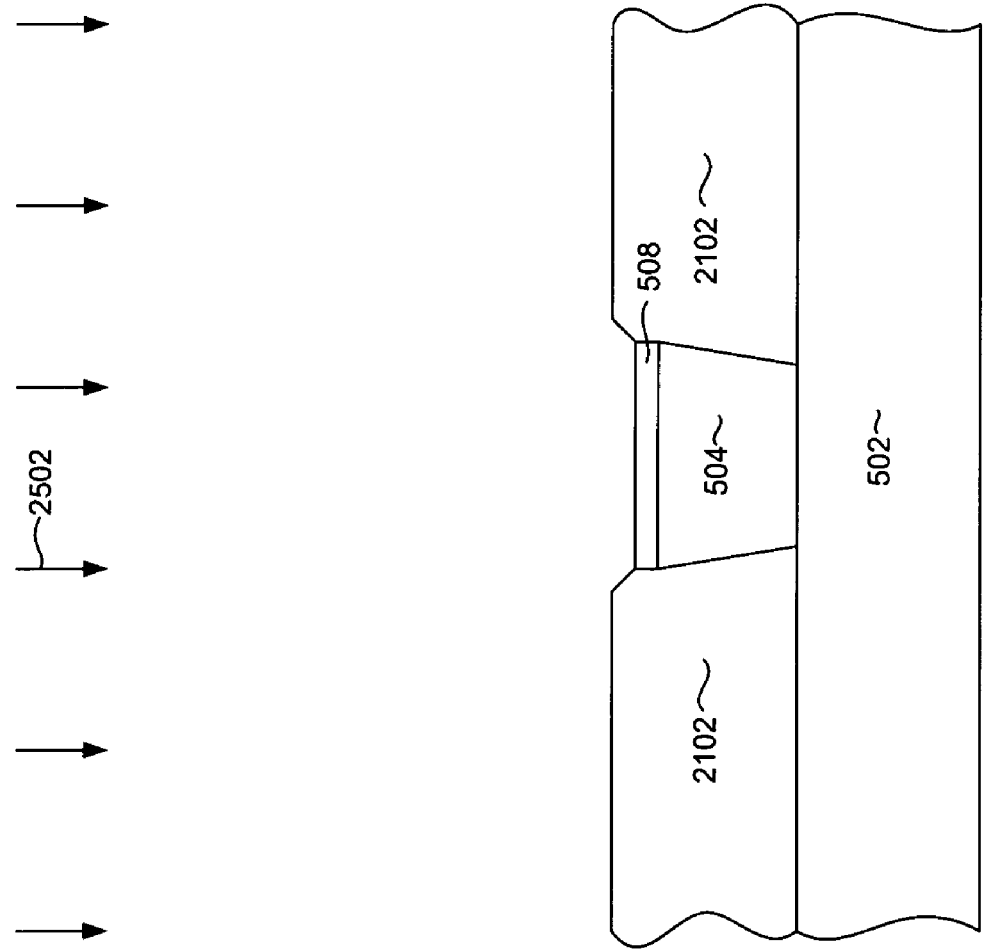

With reference now to FIG. 25, an ion mill 2502 is performed to widen the notch formed in the alumina fill layer 2102 at either side of the thin alumina layer 508. This ion mill 2502 is preferably performed using a $CHF_3$ gas with a short $O_2$ mill as a clean up step. Alternatively, the ion mill 2502 could be performed in an Ar chemistry. The ion mill is preferably performed using a low ion beam voltage of less than 500 V. The ion mill 2502 is also preferably performed at a glancing angle such as 50-80 degrees or about 70 degrees with respect to normal. Other mill angles could be used as well. The ion mill 2502 is preferably performed for a duration that is sufficient to remove 150-250 Angstroms or about 200 Angstroms of alumina, so as to minimize damage to the thin alumina hard mask layer 508.

Figure 26:
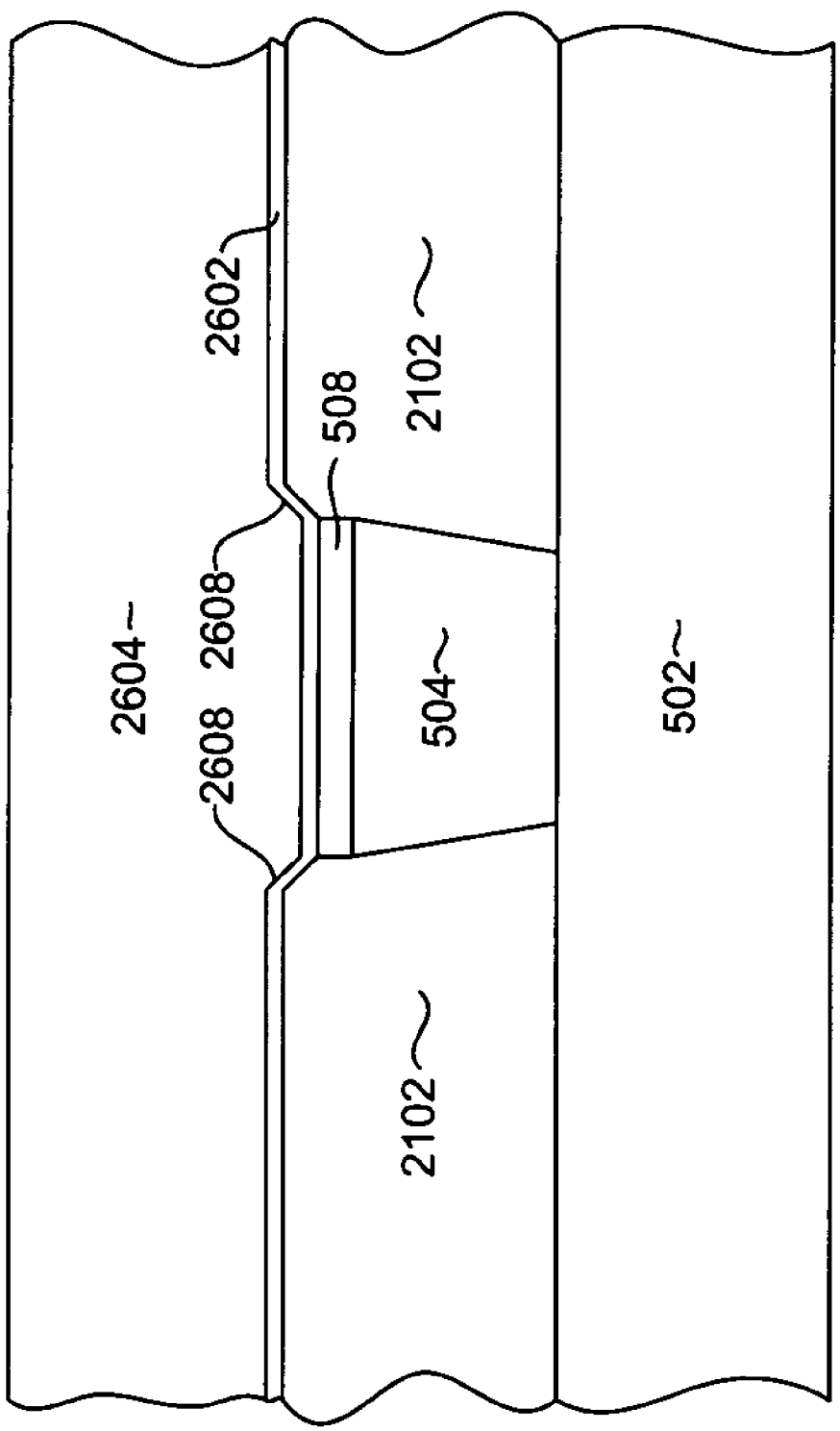

After the beveled notches have been formed in the alumina fill layer 2102, with reference to FIG. 26 a seed layer 2602 such as Rh or Ta or a combination of these or other materials is deposited. Then, a magnetic material 2604 can be electroplated to form a trailing shield having a beveled (trapezoidal) notch 2608. It should be pointed out that the process of electroplating the magnetic shield material 2604 may also include the steps of depositing a bottom anti-reflective layer (BARC) and forming a photoresist mask frame to define the outer dimensions of the trailing shield 2604, although this BARC layer and photoresist mask frame are not shown in FIG. 26.

The ion mill 2502 (FIG. 25) can shape the notch with minimal damage to the hard mask layer 508, and results in a trapezoidal notch 2608 having a depth of 0-100 nm. The trailing shield gap is formed by the combined thicknesses of the thin alumina mask layer 508 (after ion mill 2502) and the seed layer 2602. The beveled notched 2608 of the trailing shield 2604 improves seed layer 2602 deposition, and improves BARC removal. The beveled notch 2608 also improves on track field and field gradient compared to an un-notched shield. For narrow track width, the bevels 2608 also prevent magnetic saturation at the notches of the shield 2604.

Figure 27:
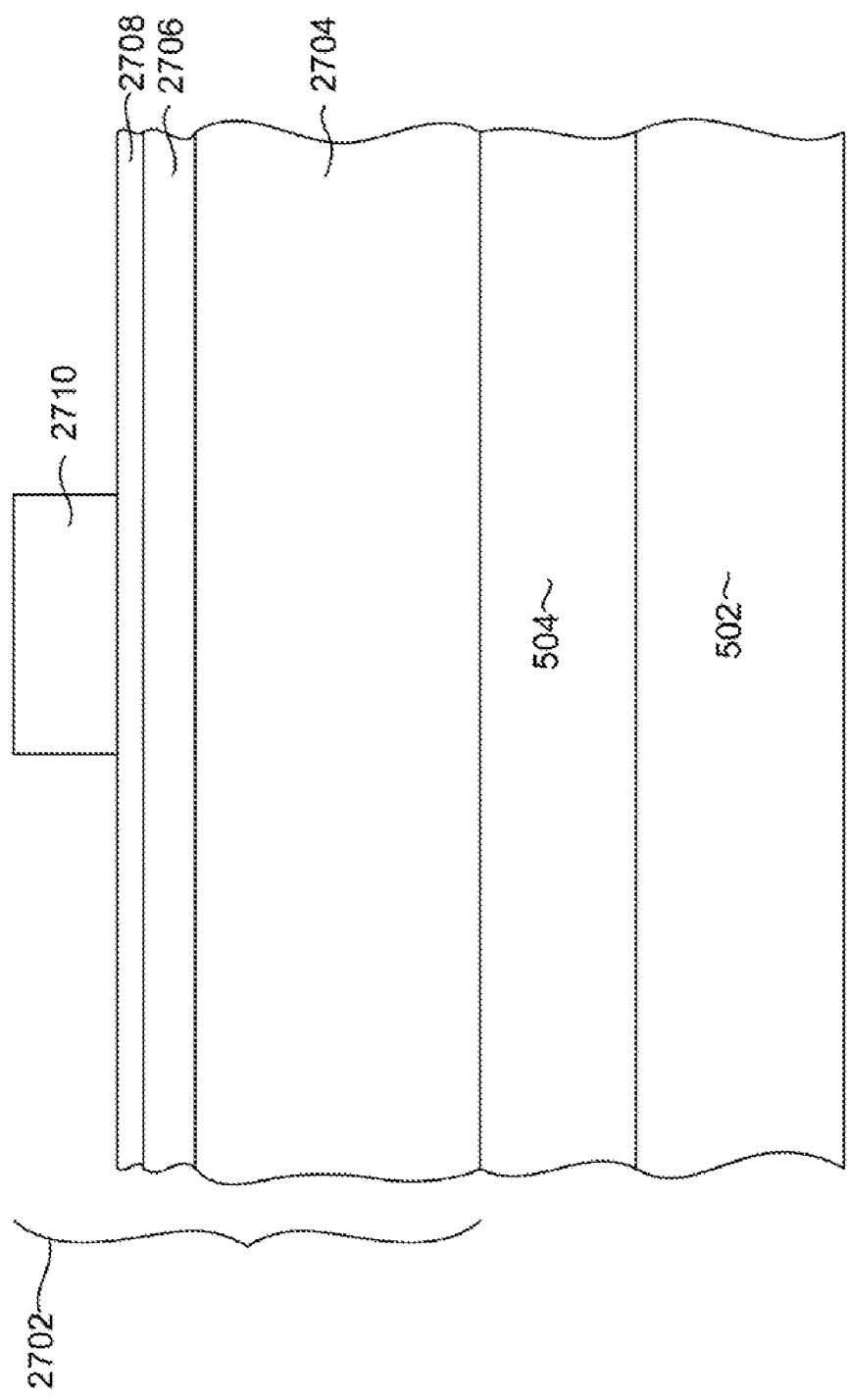
FIGS. 27-35 are views of a write head in various intermediate stages of manufacture illustrating a method of manufacturing a write head according to another possible embodiment of the invention.

Process for Constructing a Wrap Around Trailing Shield With Tight Control of Gap Thickness With reference now to FIGS. 27-35, a method is described for constructing a wrap around, magnetic, trailing shield with a tightly controlled trailing gap thickness. With particular reference to FIG. 27, a substrate 502 is provided, on which a write pole material 504 is deposited. The write pole material 504 can be a lamination of magnetic and non-magnetic layers as described above. As shown in FIG. 27, the mask layers can include an organic mask layer or image transfer layer 2704, which can be a soluble polyimide material such as DURAMIDE® and can have a thickness of 1000-1400 nm or about 1200 nm. The mask 2702 may also include a hard mask 2706 such as $SiO_2$, a thin second image transfer layer 2708 that may also be constructed of a soluble polyimide solution such as DURAMIDE® and a resist mask 2710, such as photoresist or thermal image resist, patterned to define a write pole track width. The hard mask layer 2706 can have a thickness of 50-150 nm or about 100 nm, and the second image transfer layer 2708 can have a thickness of 50-130 nm or about 90 nm.

Figure 28:
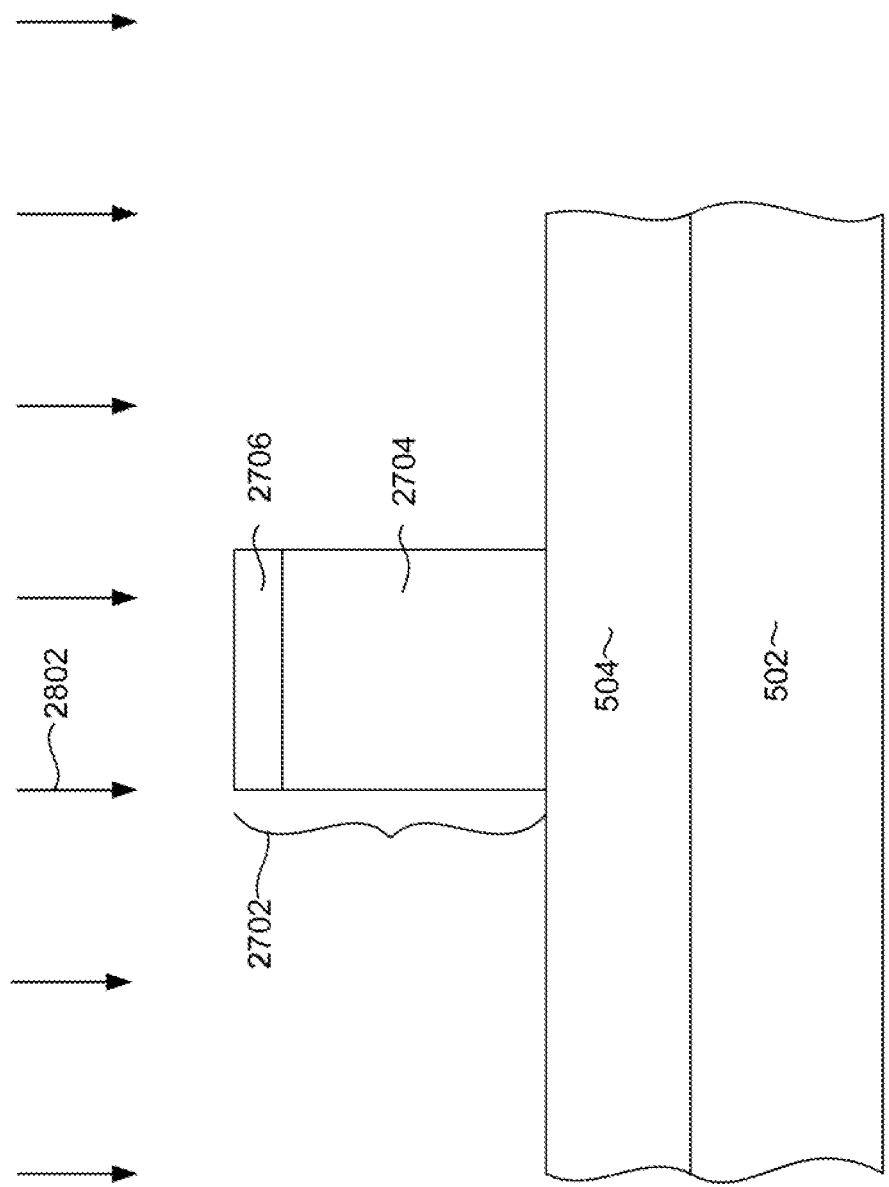
Figure 29:
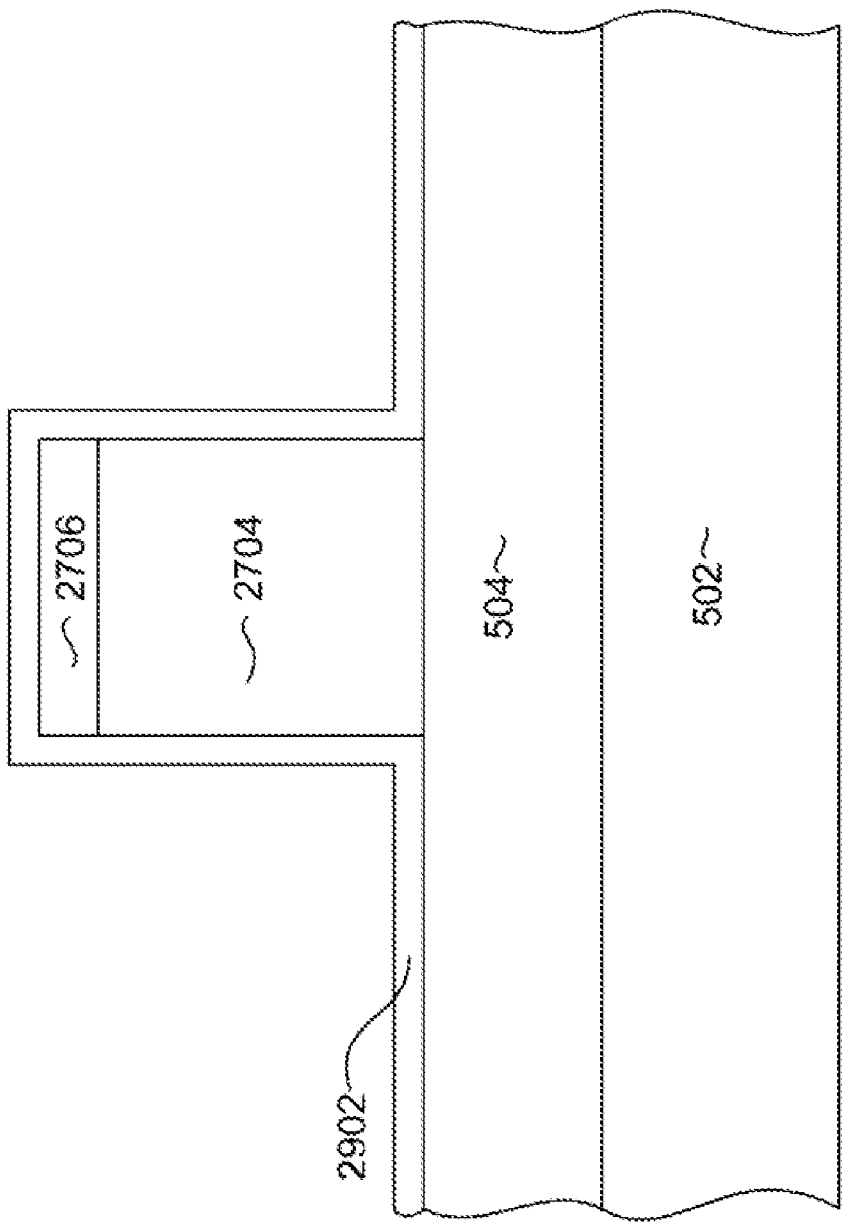

With reference to FIG. 28, a reactive ion etch 2802 is performed to transfer the image of the resist mask 2710 onto the underlying mask layers 2704, 2706, 2708 and 2710. The RIE 2802 may remove the upper image transfer layer 2708 and resist mask 2710. Then, with reference to FIG. 29, a thin layer of alumina 2902 is deposited. The alumina layer 2902 is preferably deposited by a conformal deposition method such as atomic layer deposition, chemical vapor deposition, etc. and can be deposited to a thickness of 10-30 nm.

Figure 30:
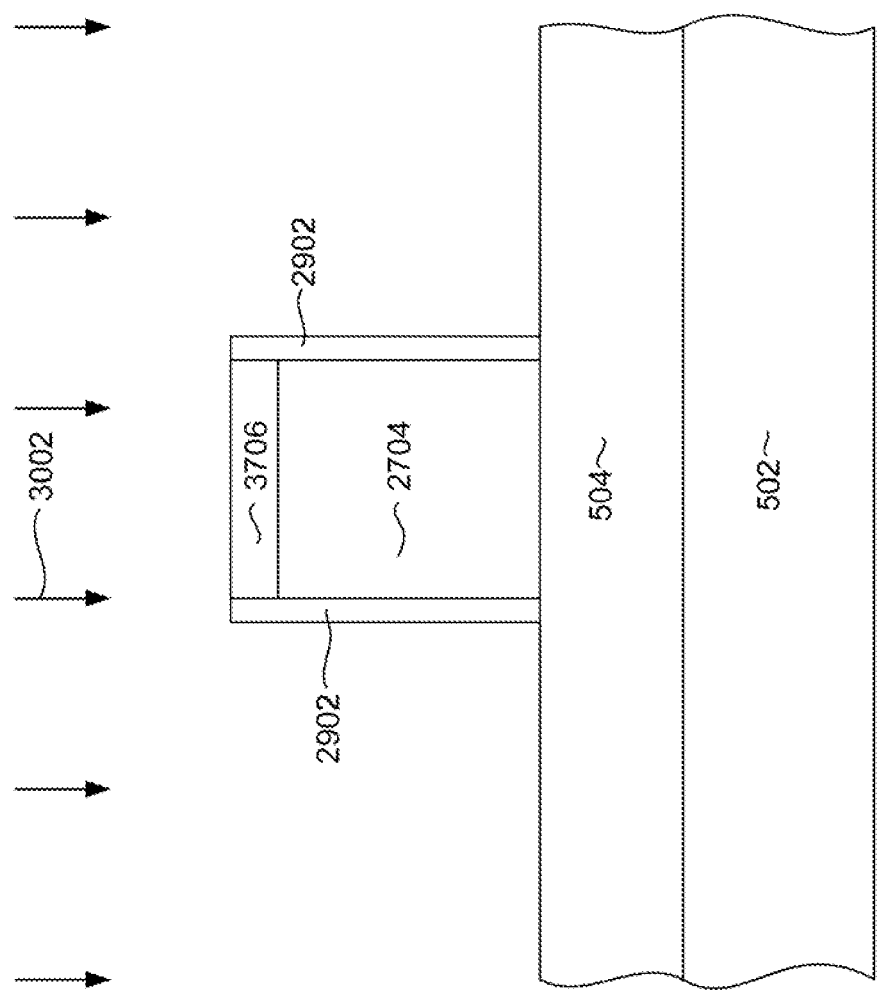
Figure 31:
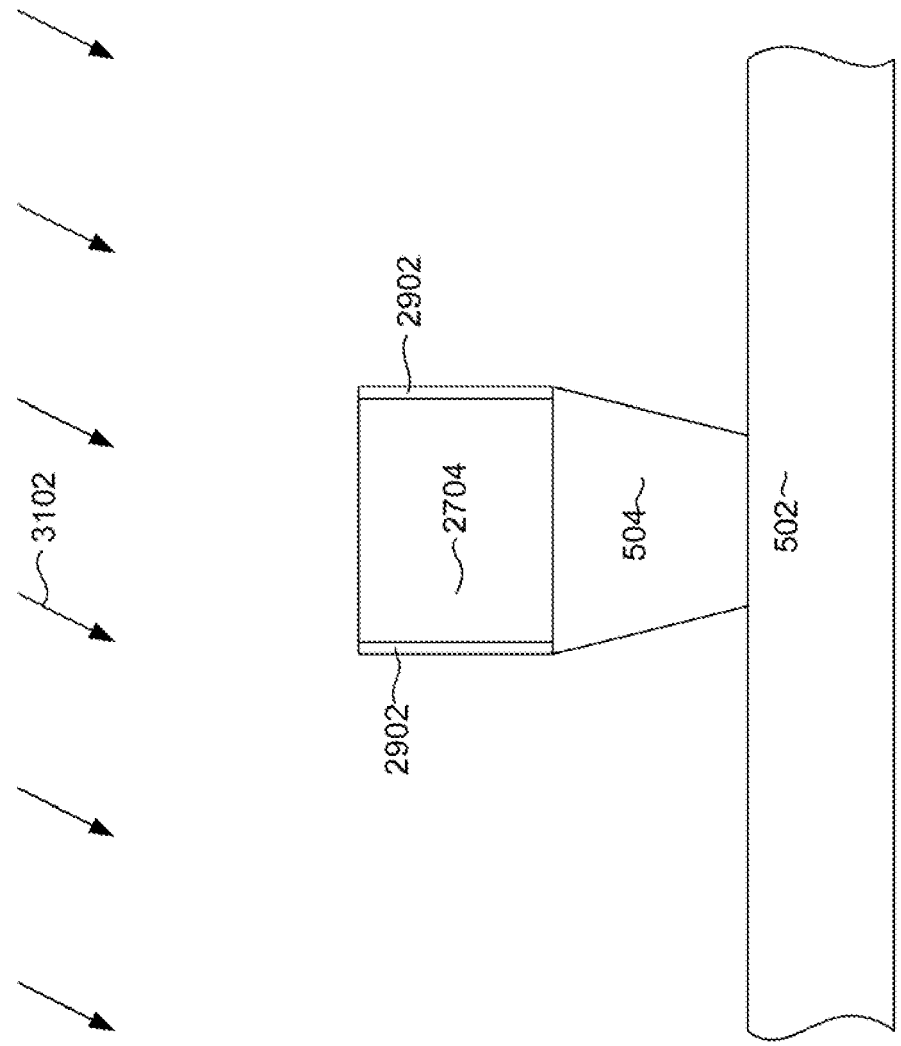

With reference now to FIG. 30, an ion mill 3002 is performed in an Ar or $CHF_3$ atmosphere. This ion mill 3002 preferentially removes the horizontally disposed portions of the alumina layer 2902, leaving alumina walls 2902 on the sides of the remaining mask layers 2704, 3706. With reference now to FIG. 31, another ion mill 3102 is performed to remove portions of the write pole material 504 that are not protected by the mask layer 2704 and alumina layers 2902. The ion mill 3102 may be performed at an angle or a plurality of angles to form the write pole with a desired trapezoidal, tapered shape. The alumina walls 2902 are resistant to the ion milling 3102 used to define the write pole, and ensure that the critical dimensions of the write pole 504 such as the trailing edge width will be well defined during the ion milling 3102. The alumina side walls prevent the remaining mask structure 2704 from being consumed by the ion mill 3102.

Figure 32:
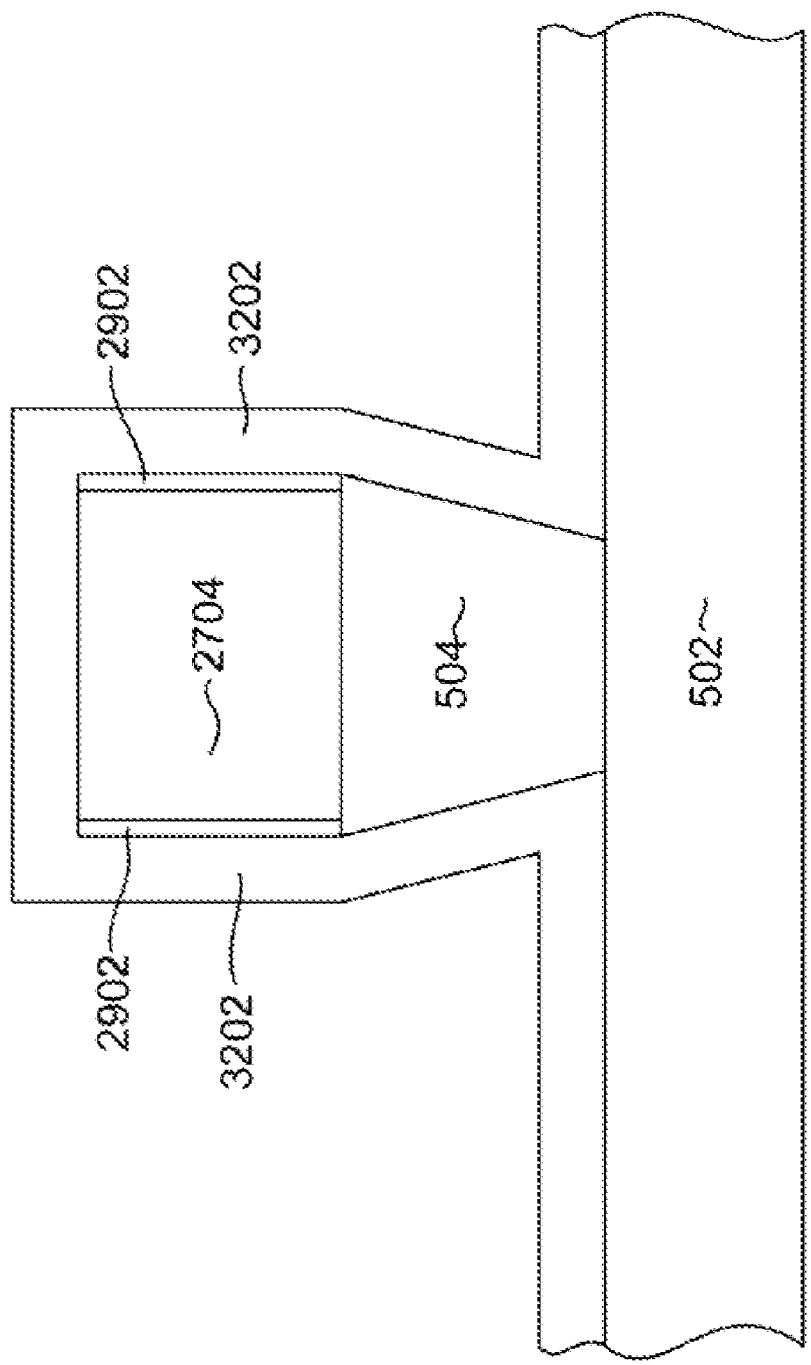

After the write pole has been formed, with reference to FIG. 32, a non-magnetic side gap defining layer 3202 is deposited. The non-magnetic side gap defining layer 3202 is preferably constructed of conformally deposited alumina, deposited by a process such as atomic layer deposition (ALD), chemical vapor deposition (CVD), etc, and will be referred to as ALD layer 3202. The ALD layer 3202 can be deposited to a thickness of 40-140 nm or about 90 nm.

Figure 33:
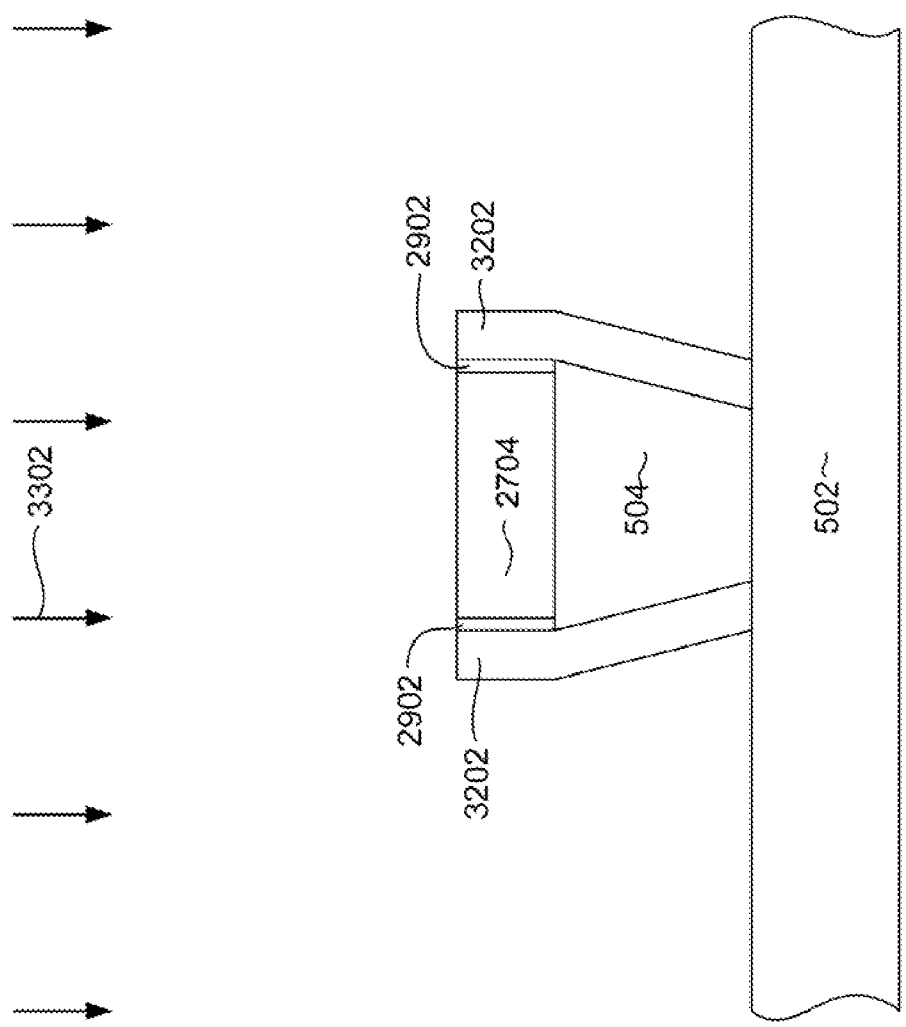
Figure 34:
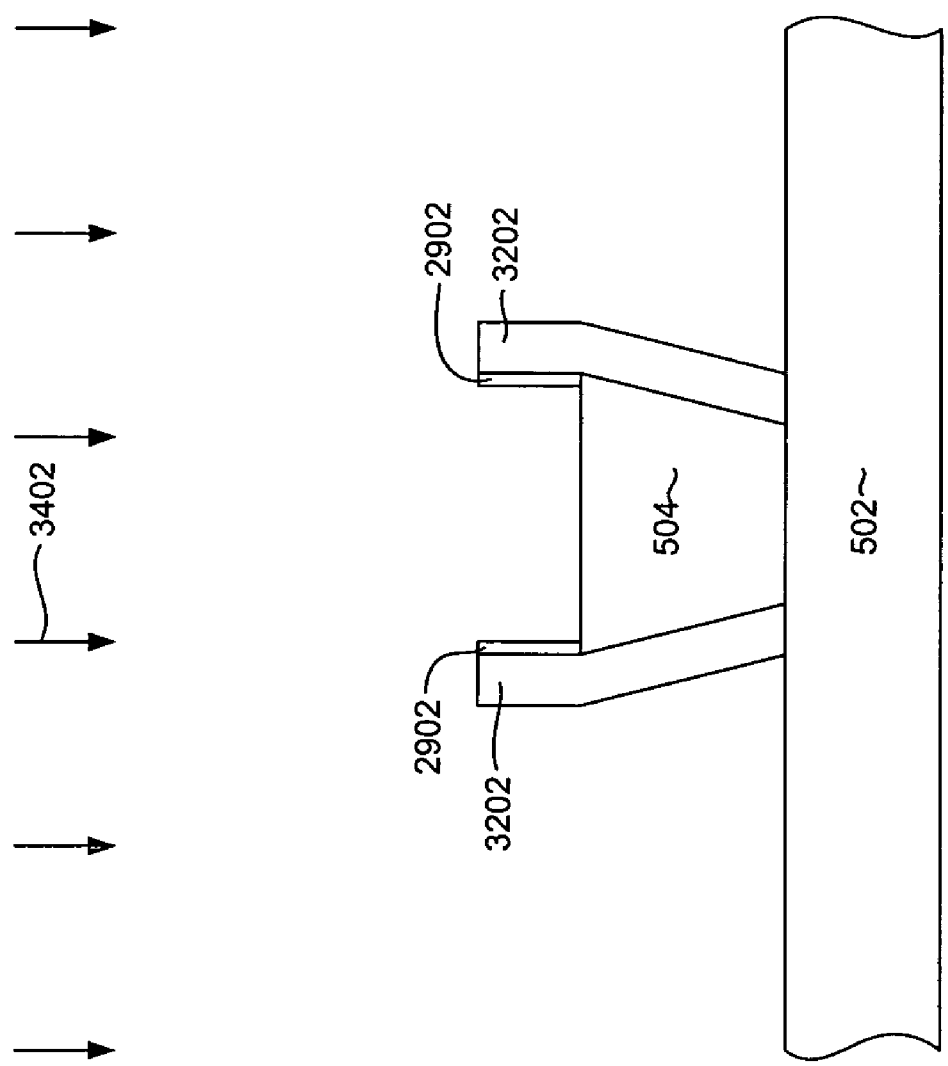
Figure 35:
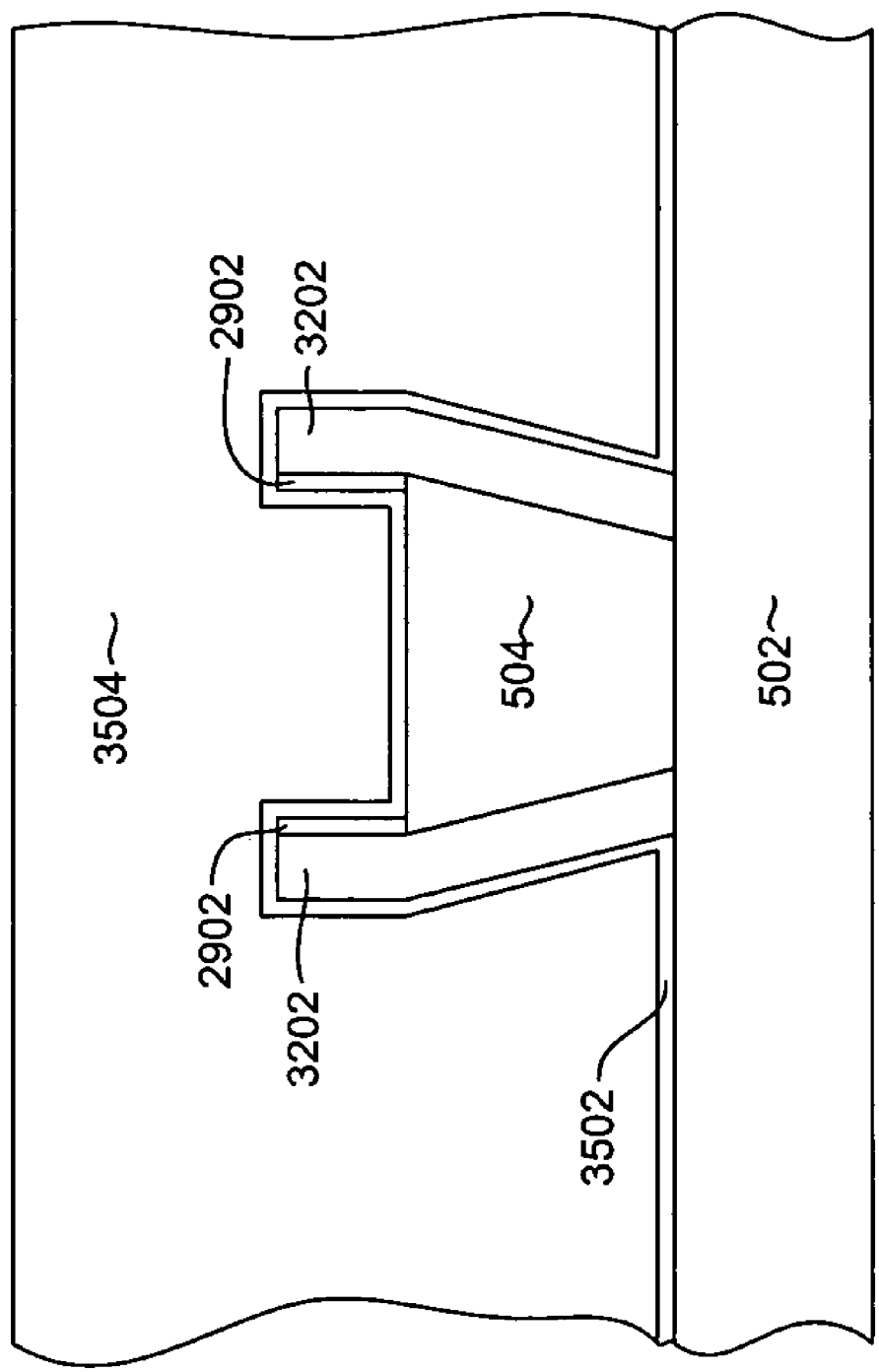

With reference to FIG. 33, a reactive ion mill (RIM) 3302 is performed, preferably using a $CHF_3$ chemistry. The RIM 3302 preferentially removes the horizontally disposed portions of the ALD layer 3202 and is performed until the image transfer layer 2704 has been opened up. The, with reference to FIG. 34, a reactive ion etch (RIE) 3402 is performed to remove the remaining image transfer layer 2704 exposing the top of the write pole 504. Then, with reference to FIG. 35, a non-magnetic, electrically conductive seed layer 3502 is deposited. The seed layer 3502 is deposited to a thickness to define a desired trailing shield gap thickness. A layer of magnetic shield material 3504 such as NiFe is then deposited by electroplating using the seed layer 3502 as a plating seed.

As can be seen, the trailing shield gap is defined by deposition of the seed layer 3502, rather than by a subtractive method, which allows the trailing shield gap thickness to be easily controlled. This is possible because the alumina side walls 2902 eliminate the need for a hard mask formed over the top of the write pole, eliminating the need to remove a hard mask from the top of the write pole 504. Eliminating the need to remove a hard mask from the top of the write pole also avoids damage to the write pole 504 that might otherwise result from the removal of such a hard mask.

Figure 36:
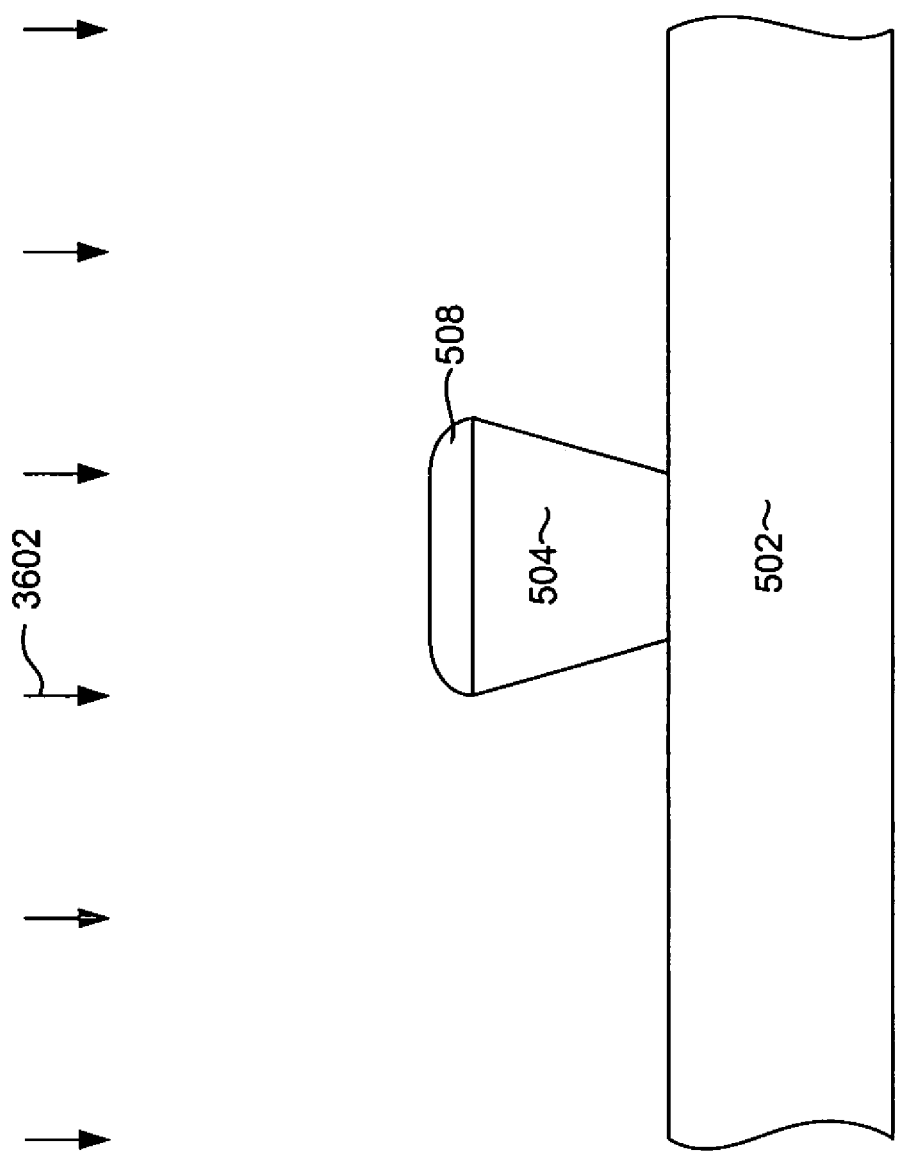
FIGS. 36-46 are views of a write head in various intermediate stages of manufacture illustrating a method of manufacturing a write head according to another possible embodiment of the invention.

Wrap Around Shield Gap Definition for Perpendicular Head Wrap Around Shield Process With reference now to FIGS. 36-46, a method for constructing a magnetic write head according to yet another embodiment of the invention is described. With particular reference to FIG. 36, a write pole 504 is formed on a substrate 502. The write pole 504 can be constructed according to methods described with reference to FIGS. 5-6. A developer based etch, such as tetramethylammonium hydroxide solution (TMAH), is followed by a resist strip process 3602 such as N-methylpyrollidone (NMP). This leaves the alumina hard mask layer remaining over the write pole 504.

Figure 37:
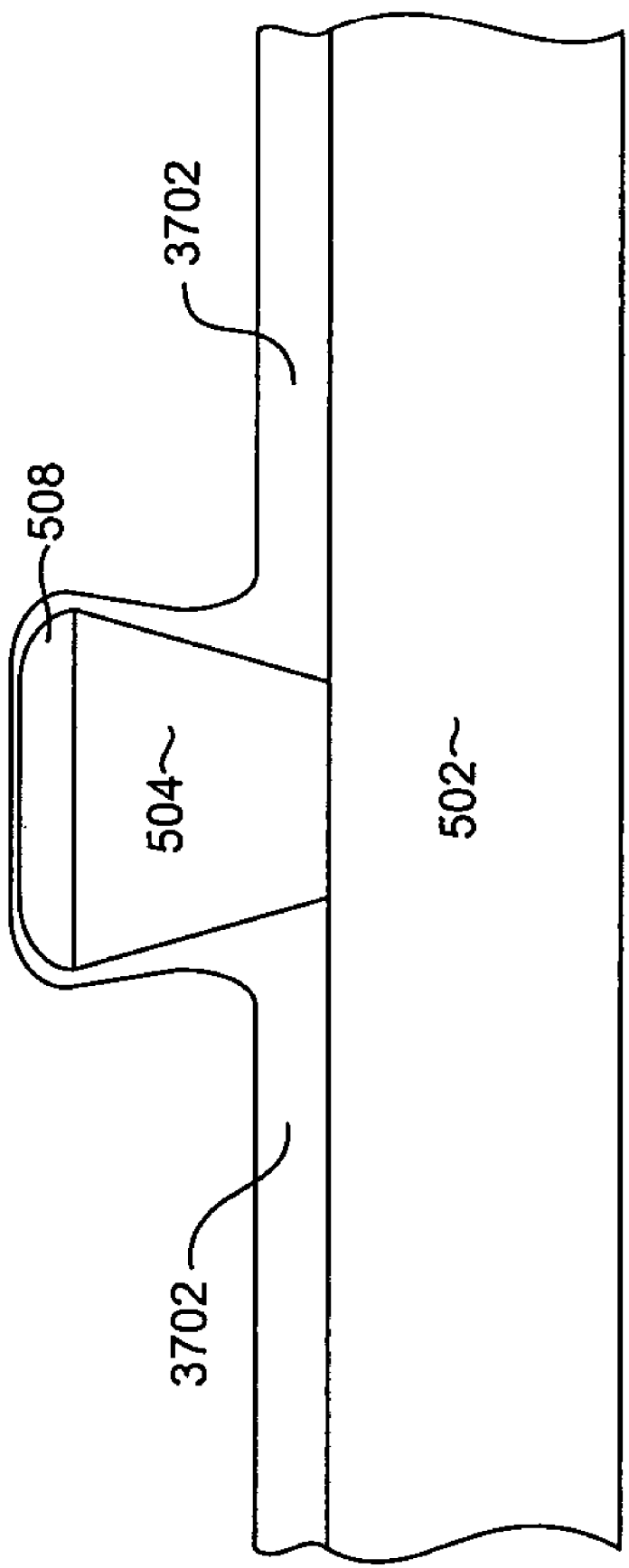

With reference to FIG. 37, a protective layer of material such as photoresist, polymethylglutamide (PMGI), or a soluble polyimide such as DURAMIDE® is deposited. This layer can be deposited to a nominal thickness of about 120 nm. However, because the write pole is much higher than the surrounding structure, the protective layer 3702 tends to be much thinner at the top of the pole than at the base of the pole or in the field.

Figure 38:
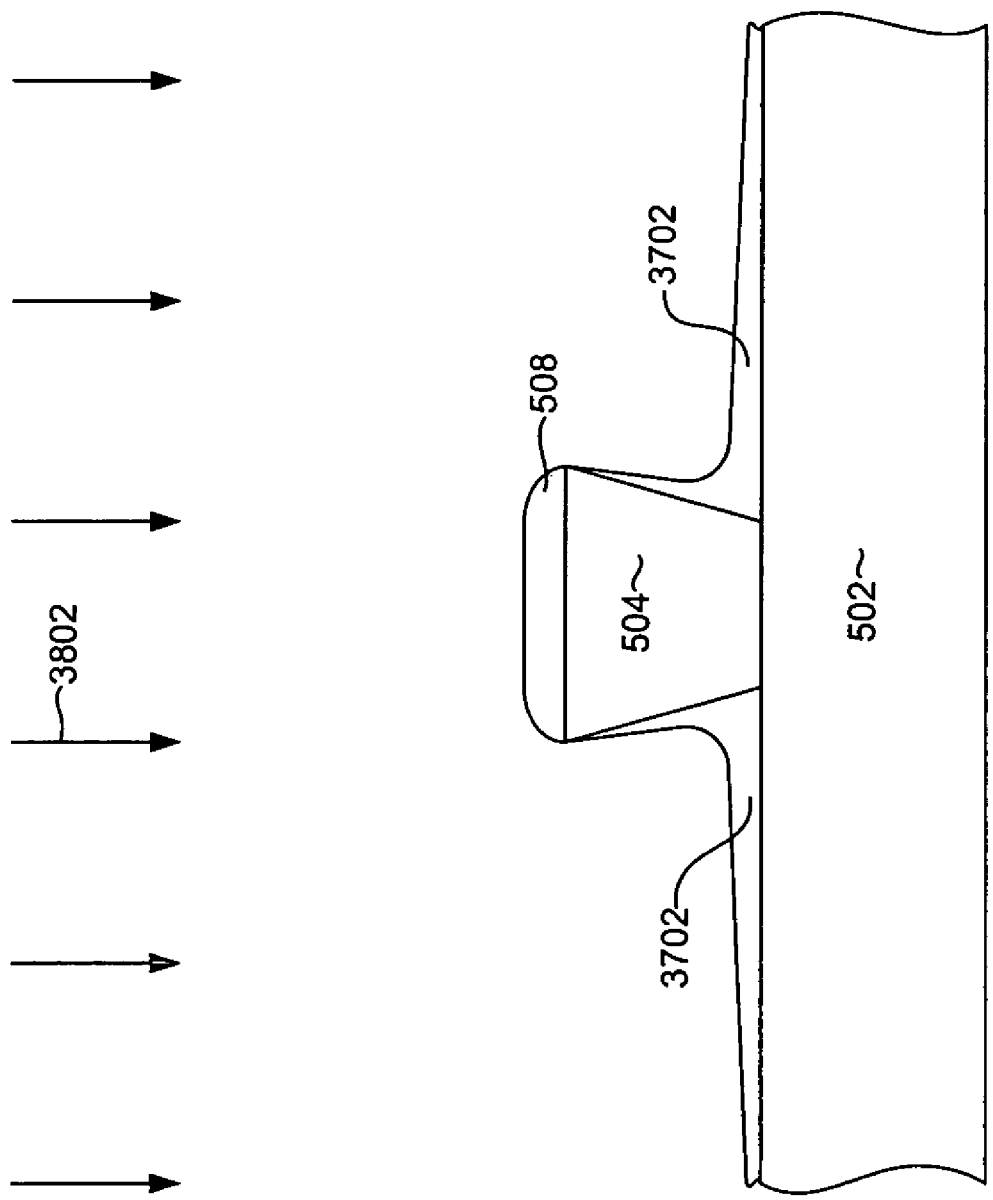
Figure 39:
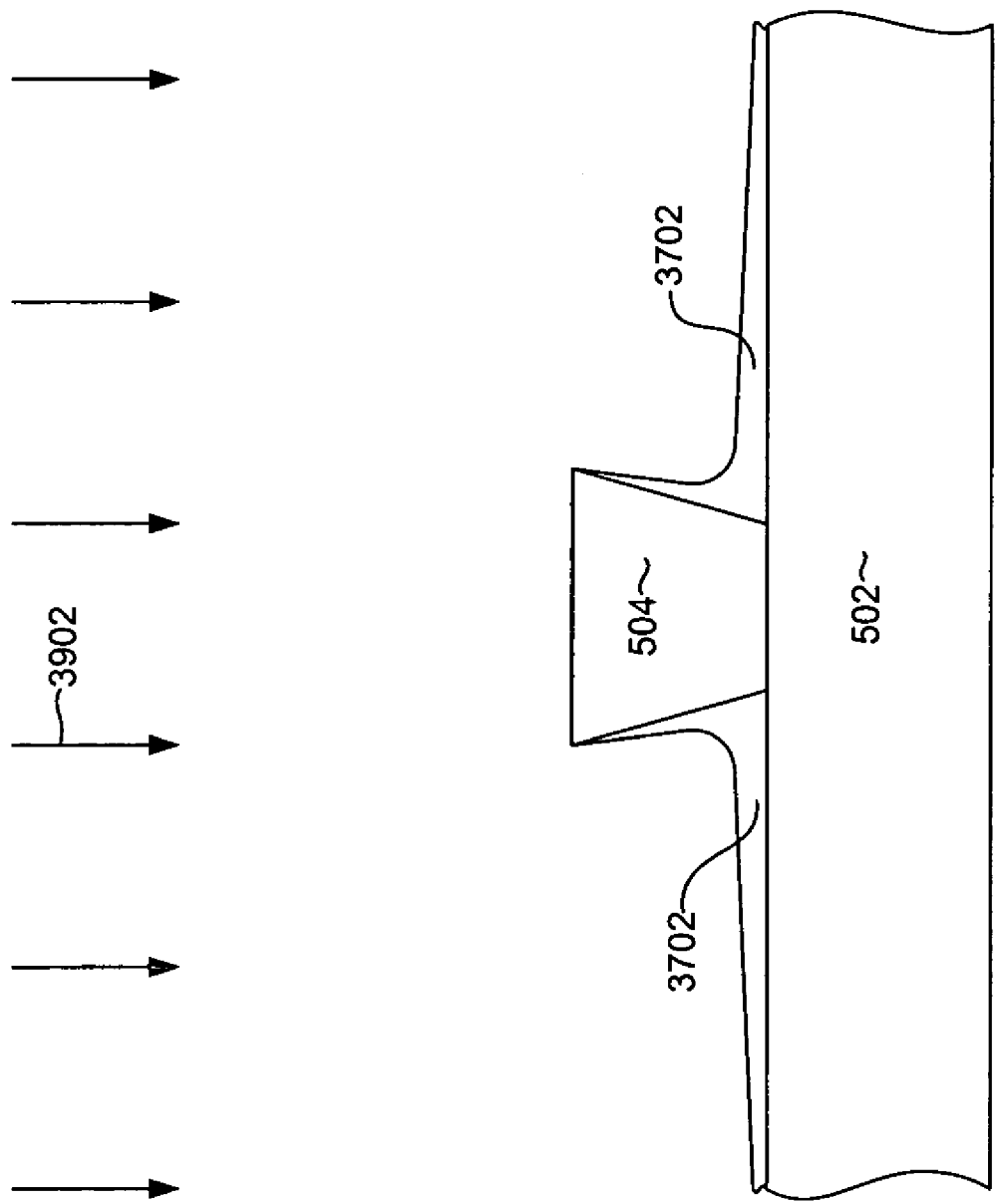

With reference to FIG. 38, a reactive ion etch (RIE) 3802 is performed to remove any of the protective layer 3702 from the top of the write pole 504 and alumina mask 508. Then, with reference to FIG. 39, a developer etch 3902 is performed to remove the remaining alumina mask 508 from the top of the write pole 504. The protective layer 3702 protects the sides and base of the write pole 504 during the developer etch 3902.

Figure 40:
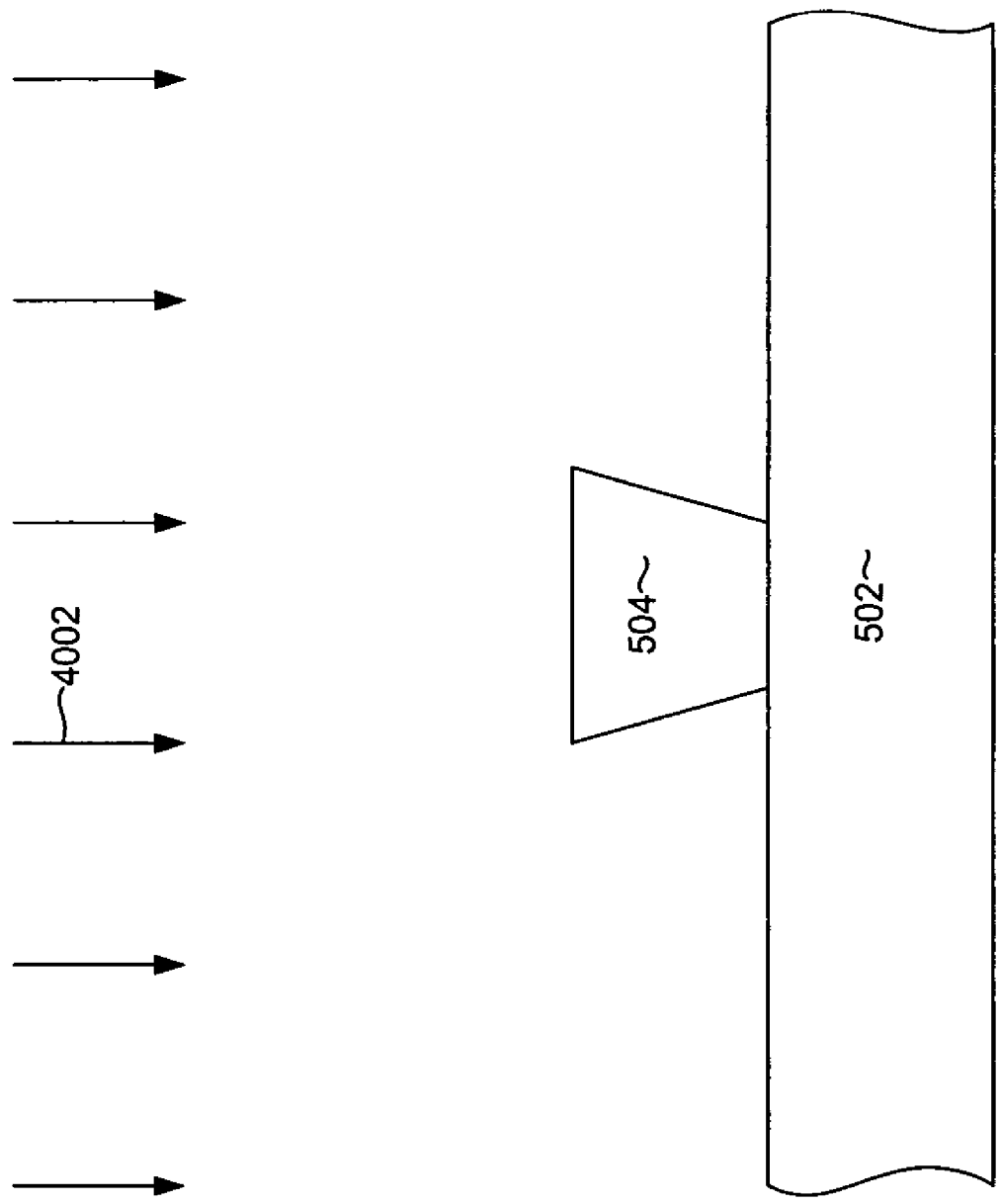
Figure 41:
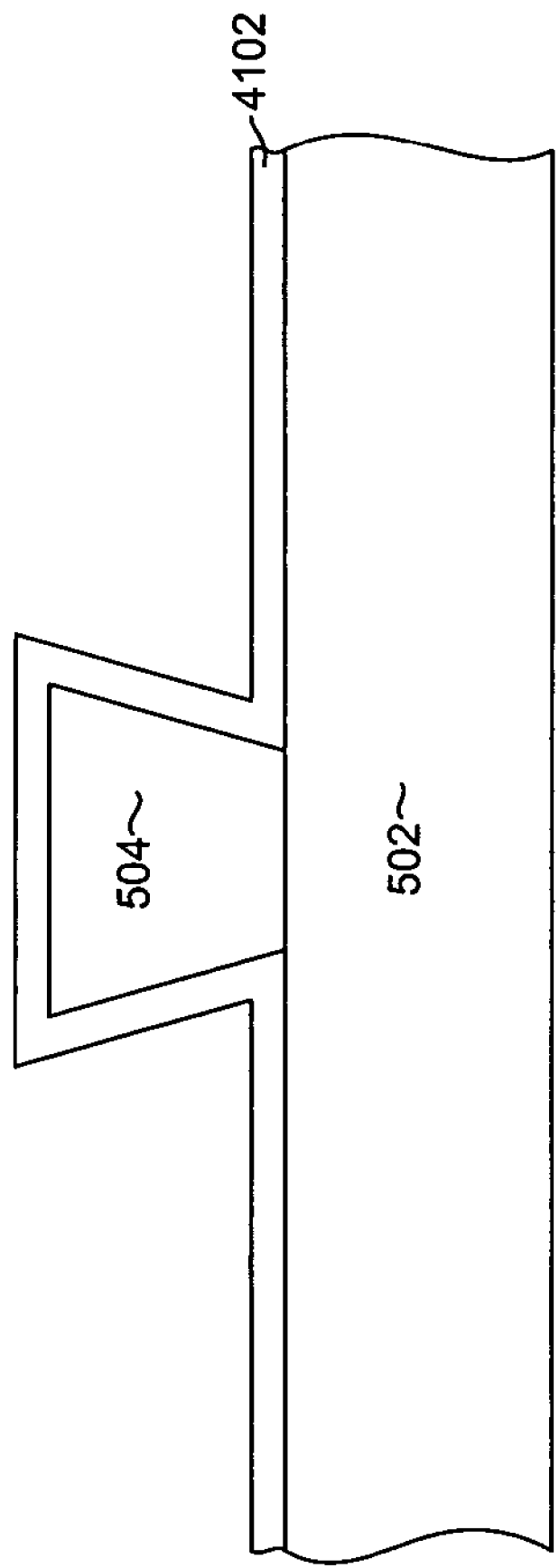

Then, with reference to FIG. 40, another reactive ion etch (RIE) 4002 is performed to remove the remaining protective layer 3702 from the base of the write pole 504 and from the field area. With reference to FIG. 41 first alumina layer 4102 is deposited, preferably by a conformal deposition method such as atomic layer deposition (ALD), chemical vapor deposition (CVD), etc. The first alumina layer 4102 is can be deposited to a thickness of 5-15 nm or about 10 mm.

Figure 42:
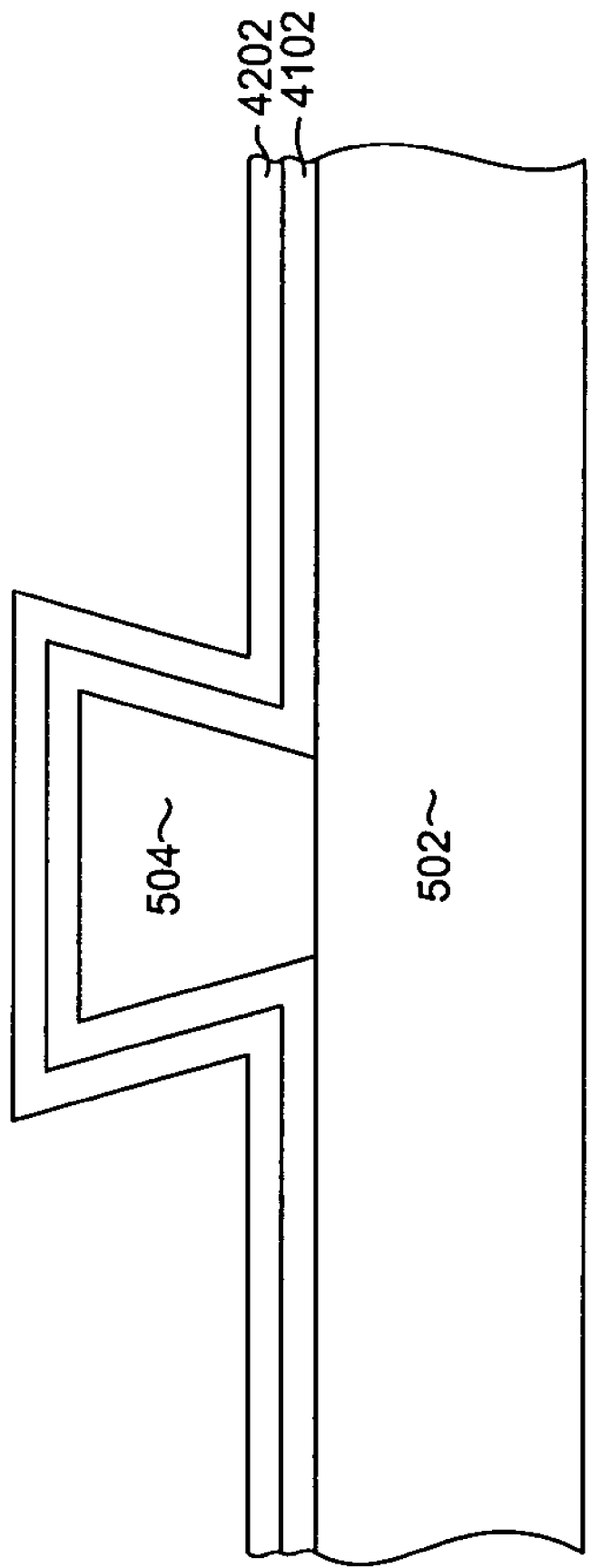
Figure 43:
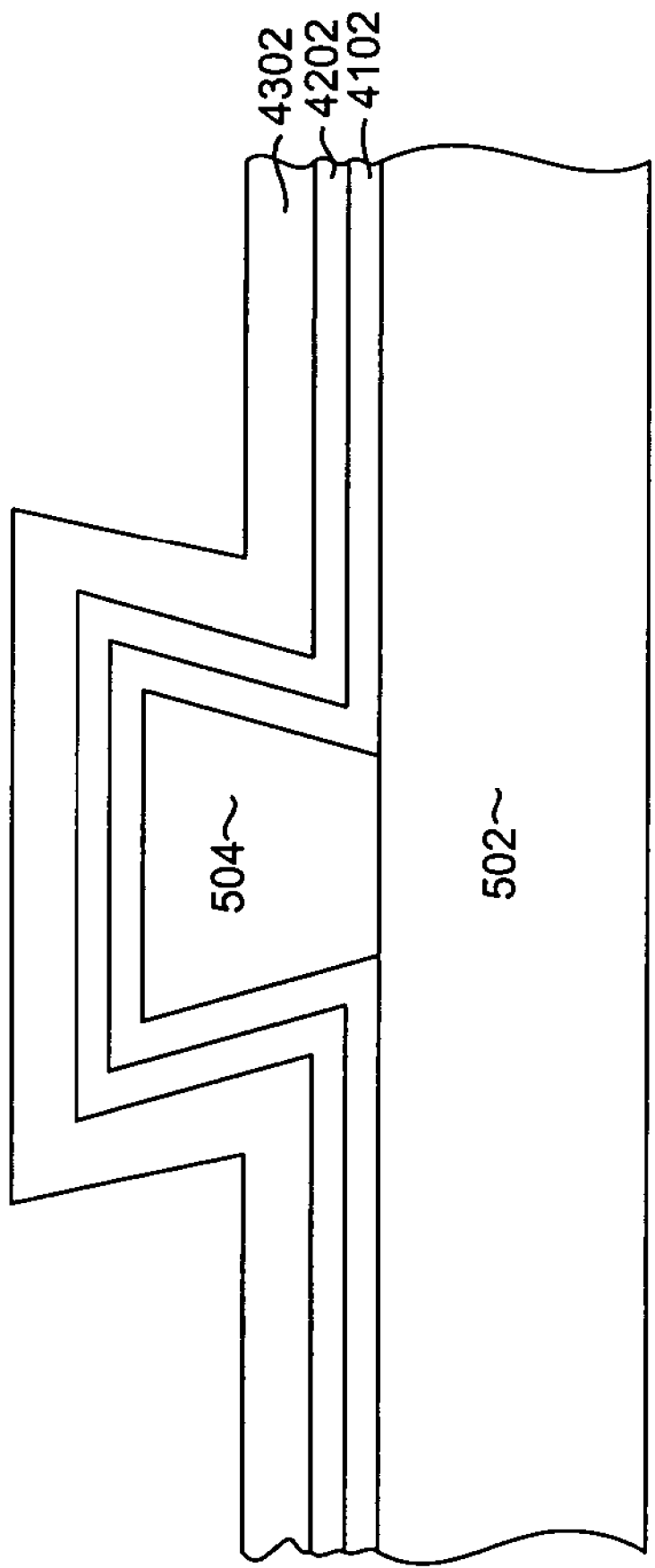

Then, with reference to FIG. 42 a non-magnetic film 4202 is deposited over the first alumina layer 4102. The non-magnetic film 4202 can be a material such as Rh, Cr, NiCr, Ta, Ni, W etc. and can be deposited to a thickness of 10-30 nm or about 20 nm. The non-magnetic layer 4202 is also preferably deposited by a conformal deposition method. Then, with reference to FIG. 43, a second layer of alumina 4302 is deposited over the non-magnetic film 4202. The second alumina layer 4302 can be deposited thicker than the first alumina layer 4102 and can have a thickness of 40-60 nm or about 50 nm. The second alumina layer 4302 is also preferably deposited by a conformal deposition method.

Figure 44:
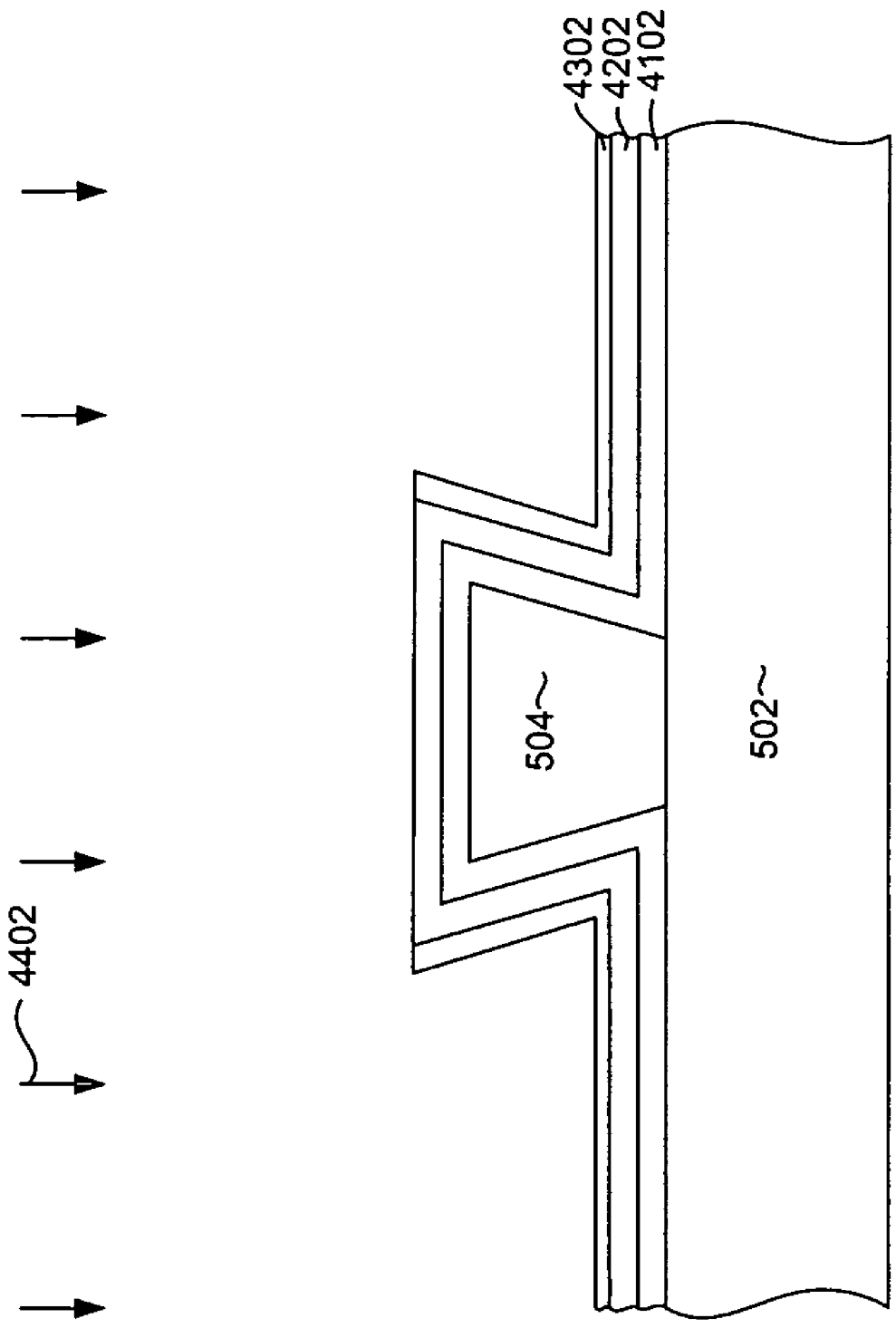

With reference now to FIG. 44 a reactive ion mill (RIM) 4402 is performed to remove a portion of the second alumina layer 4302 from the area over the top of the write pole 504, exposing the non-magnetic film 4202 from a region over the write pole 504. The reactive ion mill 4402 is preferably performed in a $CHF_3$ chemistry. The RIM 4402 removes horizontally disposed portions of the second alumina layer 4302 while leaving the side wall portions substantially intact. The non-magnetic film layer 4202 serves as a RIM stop on top of the pole to protect the pole from the reactive ion milling 4402 due to its lower etching rate than alumina. Alternatively, an Ar based ion mill 4402 can also be used. In this case the layer 4202 can be used for end point detection.

Figure 45:
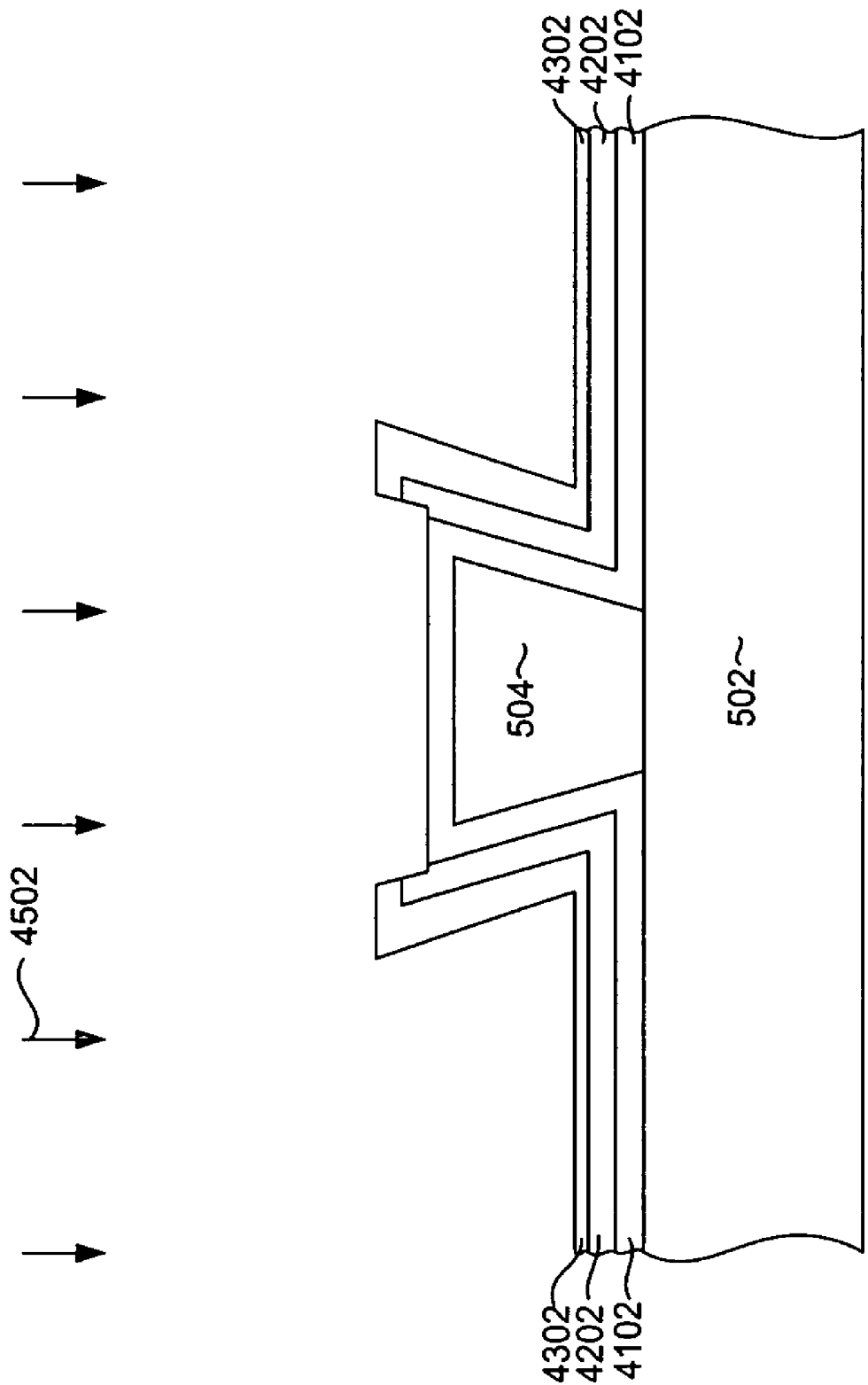

With reference now to FIG. 45 an ion mill 4502 is performed to remove the exposed portion of the non-magnetic film 4202 from the region over the write pole 504. The ion mill 4502 can be performed with an Ar chemistry and preferentially removes the non-magnetic film 4202 much faster than the alumina layers 4302, 4102. The ion mill 4502 can be performed using an end point detection scheme to stop at the underlying first alumina layer 4102. The remaining, exposed portion of the first alumina layer 4102 over the write pole 504 can be removed, such as by a developer etch, or can be left intact to form a part of the trailing shield gap.

Figure 46:
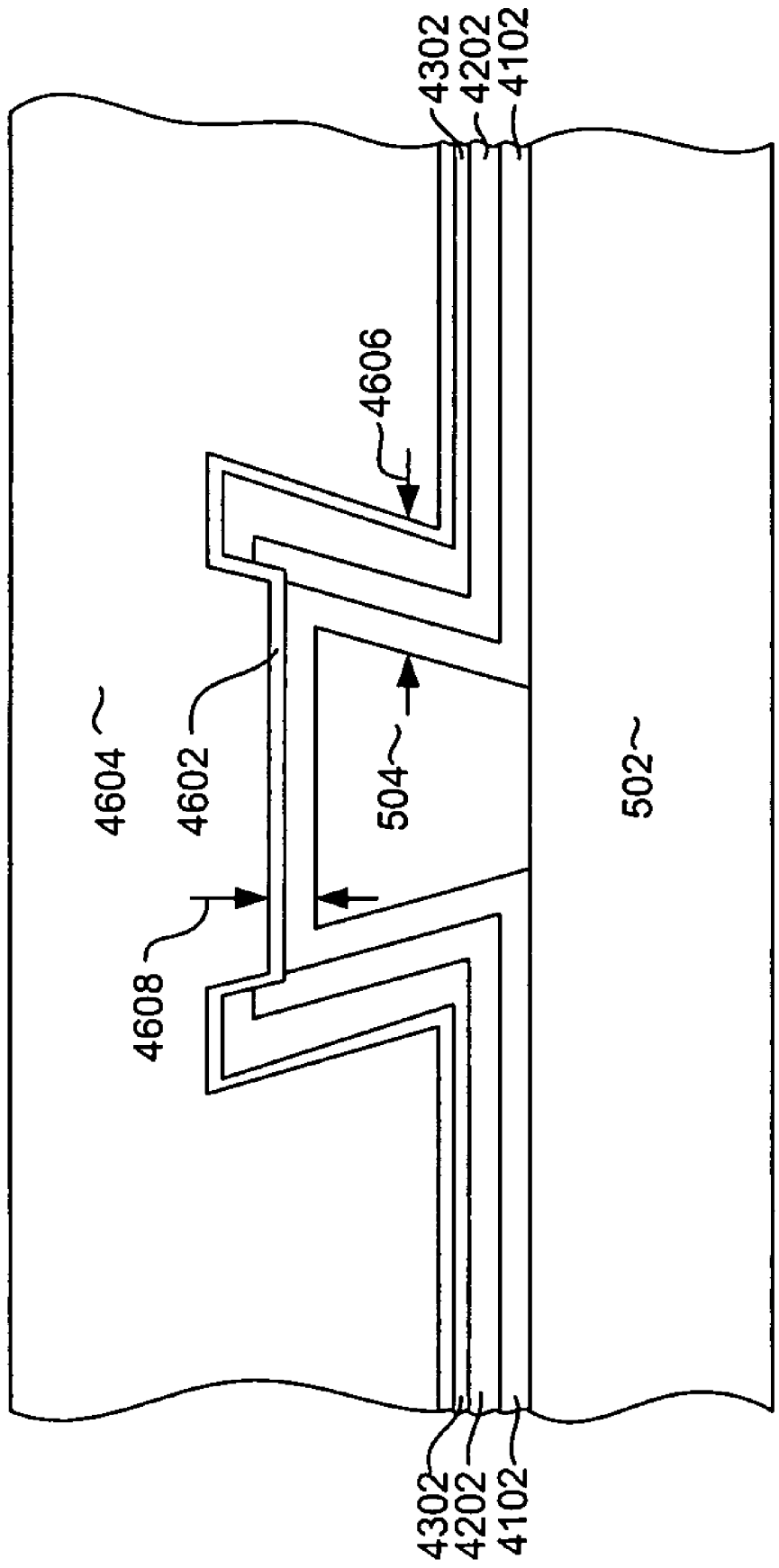

With reference to FIG. 46, a non-magnetic, electrically conductive seed layer 4602 is deposited to such a thickness that the combined thicknesses of the seed layer 4602 and underlying first alumina layer 4102 (if not previously removed) define a desired trailing shield gap thickness. For example, the seed layer 4602 can be deposited to a thickness of 30-50 nm or about 40 nm. Then, a magnetic material 4604 can be deposited by electroplating to form a trailing shield gap that wraps around the write pole. As can be seen, the shield 4604 has a side gap 4606 that is much larger than the trailing gap 4608.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A write head for perpendicular magnetic recording, comprising:
   a magnetic write pole;
   first and second laterally opposed sides formed on the write pole;
   a leading edge extending from the first side to the second side; and
   a trailing edge located opposite the leading edge and extending from the first side to the second side, the trailing edge having a concave shape; and
   a magnetic trailing wrap around shield, the shield being separated from the trailing edge of the write pole by a non-magnetic trailing gap, and being separated from the first and second sides of the write pole by first and second non-magnetic side gaps;
   wherein the trailing gap has a thickness of 20-60 nm and the first and second side gaps have a thickness of 40-140 nm.

2. A magnetic write head as in claim 1 wherein the first and second sides are closer to one another at the leading edge than they are at the trailing edge to form the write head with a substantially trapezoidal shape.

3. A magnetic write head as in claim 1 wherein the non-magnetic trailing gap comprises Rh.

4. A magnetic write head as in claim 1 wherein the non-magnetic trailing gap comprises Rh and has a thickness of 20-60 nm.

5. A write head as in claim 1 further comprising an alumina fill layer extending laterally outward from first and second sides of the write pole.

6. A write head as in claim 1 further comprising:
   an alumina fill layer extending laterally outward from the first and second side walls; and
   a Rh trailing gap layer separating the magnetic trailing shield from the trailing edge of the write pole, the Rh trailing gap layer extending laterally beyond the first and second sides of the write pole to separate the alumina fill layer from the trailing shield.

7. A write head for perpendicular magnetic recording, comprising:
   a magnetic write pole;
   first and second laterally opposed sides formed on the write pole;
   a leading edge extending from the first side to the second side;
   a trailing edge located opposite the leading edge and extending from the first side to the second side, the trailing edge having a concave shape; and
   a magnetic trailing shield separated from the trailing edge of the write pole by a non-magnetic trailing gap wherein the non-magnetic trailing gap comprises Rh and has a thickness of about 40 nm.

* * * * *